US005745669A

United States Patent [19]
Hugard et al.

[11] Patent Number: 5,745,669
[45] Date of Patent: Apr. 28, 1998

[54] SYSTEM AND METHOD FOR RECOVERING PC CONFIGURATIONS

[75] Inventors: James M. Hugard, Aliso Viejo; Duane W. Cowgill, Tustin, both of Calif.

[73] Assignee: AST Research, Inc., Irvine, Calif.

[21] Appl. No.: 670,103

[22] Filed: Jun. 21, 1996

Related U.S. Application Data

[63] Continuation of Ser. No. 141,228, Oct. 21, 1993, abandoned.
[51] Int. Cl.⁶ .................................................. G06F 11/00
[52] U.S. Cl. .................................................. 395/182.01
[58] Field of Search ........................ 395/182.01, 183.12, 395/183.13, 183.14, 183.17, 185.02, 185.1; 371/24; 364/264.6, 264.7, 975.2, 975.4, 976.4, 267.4, 268, 269.2, 281.9, 285.1, 285.3, 921.9; 324/158.1

[56] References Cited

U.S. PATENT DOCUMENTS

| | | | |
|---|---|---|---|
| 4,979,107 | 12/1990 | Advani et al. | 364/200 |
| 5,133,065 | 7/1992 | Cheffetz et al. | 395/181 |
| 5,159,597 | 10/1992 | Monahan et al. | 371/16.1 |
| 5,193,174 | 3/1993 | Bealkowski et al. | 395/500 |
| 5,274,819 | 12/1993 | Blomfield-Brown | 395/700 |
| 5,287,504 | 2/1994 | Carpenter et al. | 395/600 |
| 5,291,488 | 3/1994 | Jestice et al. | 370/85.1 |
| 5,307,497 | 4/1994 | Feigenbaum et al. | 395/700 |
| 5,353,432 | 10/1994 | Richek et al. | 395/500 |
| 5,367,667 | 11/1994 | Wahlquist et al. | 395/575 |
| 5,381,403 | 1/1995 | Maher et al. | 370/13 |
| 5,390,335 | 2/1995 | Stephan et al. | 395/800 |
| 5,469,573 | 11/1995 | McGill, III et al. | 395/700 |
| 5,497,490 | 3/1996 | Harada et al. | 395/700 |

OTHER PUBLICATIONS

Systems/Software Engineering, "DR/VFI (Disaster Recovery/Vital File Identifier)" Software Product Specification, Ziff-Davis Publishing, Software Release Review Date 1991.

Gillilan, "Bulletproof Backup: Sitback Ver.3.02", Software Review, PC Sources, vol. 2 No. 6 p. 319, Jun. 1991.

Brown, "Fifth Generation Systems Inc. Mace Utilities 1990", Software Review, PC Week V8 N14 p. 101, Apr. 1991.

Holzberg, "Autoback: Gets You Back To Where You Once Belonged", Software Review, Computer Shopper V11 N9 p. 566, Sep. 1991.

"The Eyes of Argus: Tritcom's Argus Keeps a Watch Over Netware Lans", Levine, M., Lan Computing May 21, 1991 V2 N11, p. 22.

"Alarm Handler for the Advanced Photon Source Control System," Kraimer et al., pp. 1314–1316, vol. 2., Conf Record of the IEEE Part. Accel. Conf., 9 May 91.

Winsleuth Gold (V.3.04) Product Specification, Dariana Software, Inc. Release Date 1992, Data Sources Report, Ziff-Davis Pub. Co., Computer Select.

WatchMan for Microsoft Windows 3.1 product sheet, 1992.

"Central Point PC Tools for Windows", pp. 509–520, 1993.

Primary Examiner—Phung Chung
Assistant Examiner—Stephen C. Elmore
Attorney, Agent, or Firm—Knobbe, Martens, Olson & Bear, LLP

[57] ABSTRACT

A computer utility automatically monitors changes in configuration files stored on the computer hard disk. The recovery tool indicates to the user when changes are detected in the configuration files and provides the option to restore the configuration files to their state before they were changed if the computer system operates improperly. In addition, the recovery tool monitors selected application files for changes in the files or missing files, and prompts the user when a change is detected. The recovery tool also provides for monitoring of the CMOS memory which stores computer system operating functions and parameters. If possible corruption of the CMOS memory is detected, the recovery tool restores the contents of the CMOS to their proper state. Finally, the computer utility provides the option of making a bootable floppy diskette containing the computer system configuration. The floppy diskette also stores files from the utility necessary to provide for restoration of the configuration, if necessary, from the floppy diskette.

19 Claims, 18 Drawing Sheets

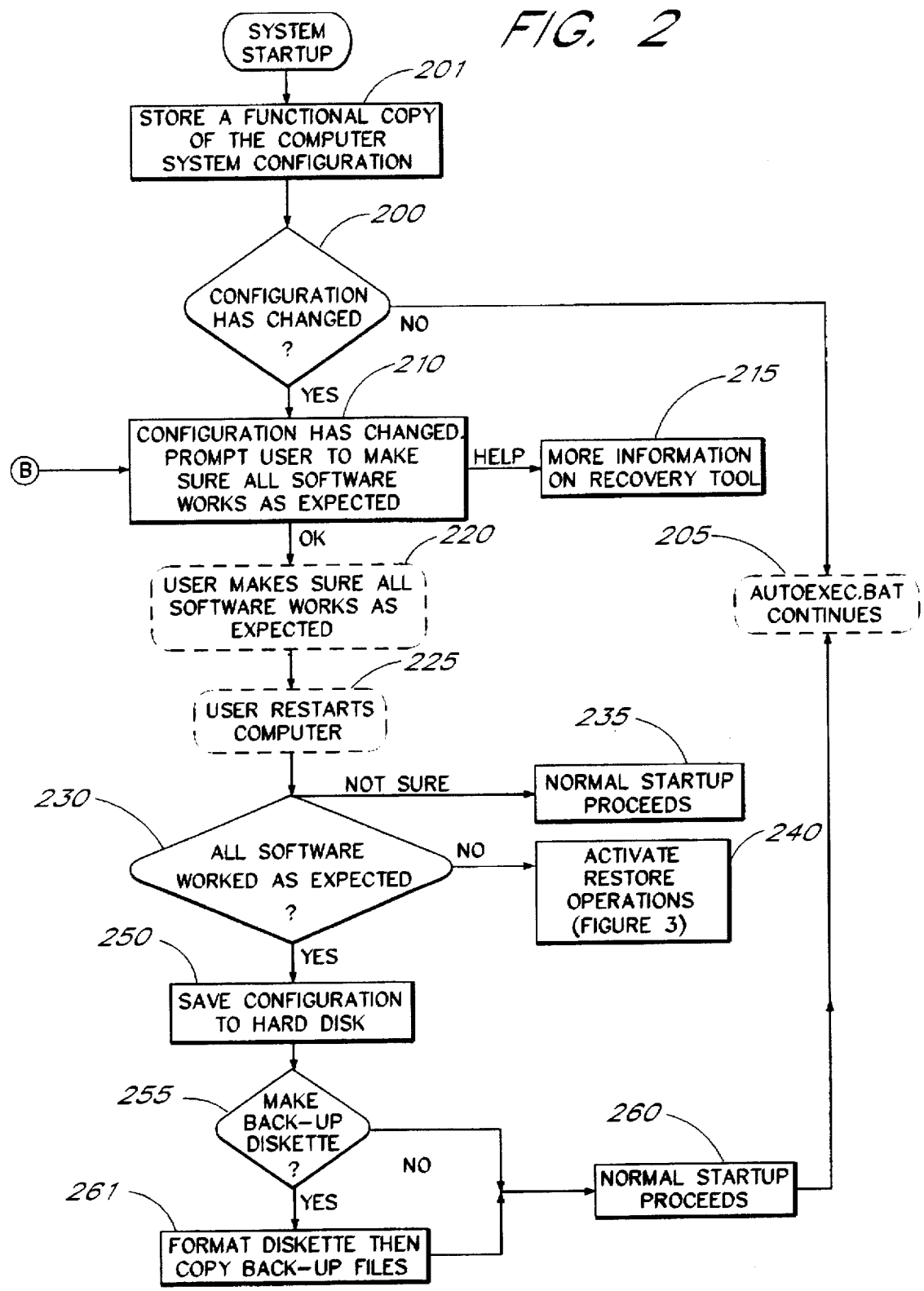

SYSTEM AND METHOD FOR RECOVERING PC CONFIGURATIONS

This application is a continuation of U.S. patent application Ser. No. 08/141,228, filed Oct. 21, 1993 now abandoned.

BACKGROUND OF THE INVENTION

1. Field of the Invention

The present invention relates generally to a system for recovering from configuration changes to a computer system. More particularly, the present invention involves a system or tool which monitors changes to the configuration in a computer System and assists in recovering a working configuration in the event that changes to the configuration cause erroneous computer operation. The present invention further provides for additional features such as monitoring the CMOS memory and application files for changes.

2. Description of the Related Art

One of the largest reported problems encountered with personal computers is improper system configuration or system configuration damage. Another common problem is missing or corrupted application files. Back-up systems have long been available which create back-up copies of computer files. Generally, existing back-up systems are difficult for an inexperienced user to adequately utilize. Most back-up programs require the user to select which files to back up. Furthermore, using existing back-up utilities is often time-consuming. If a problem occurs with software on the computer system, it is difficult for the user to determine which files should be restored in order to return the computer to its fully operational state. Accordingly, a user is often inclined to restore all software which was once backed up. Most novice computer users are not inclined to learn how to properly use their back-up software, much less to understand which files should be selected for backup and restoration.

SUMMARY OF THE INVENTION

The present invention recognizes that a need arises for a simple to use back-up utility that relates generally to the system configuration files. In general, the present invention helps assist a user to restore full and proper operation for a computer system when the configuration has become faulty or otherwise causes improper operation. The present invention provides a configuration recovery tool that automatically detects changes to files relating to a system's configuration, determines the need to create a copy of a system's configuration information, and assists in determining the need to undo or correct changes to a system's configuration. The configuration recovery tool further allows diagnosis of the common problem of missing or changed application files. With respect to application files on the computer system, the system of the present invention can be used to determine whether default-defined or user-selected files have changed. The present invention also provides for the option of scanning the CMOS non-volatile memory for integrity in an IBM AT compatible computer system. As well known in the art, the CMOS non-volatile memory stores computer system operating data and instructions. The invention also allows a user to execute a virus scan to detect and alleviate viruses which may have entered the computer system. The system of the present invention provides these features with an easy-to-use interface. One aspect of the present invention involves a method of monitoring and restoring a computer system configuration. The method involves a series of steps. First, a first backup copy of the computer system configuration when it is functional is stored on the computer data storage media. Preferably, this is stored on the hard disk subsystem. Each time the computer is started after this first back-up copy is created, the selected existing system configuration files are compared with the configuration as stored in the first backup copy to determine if changes have occurred since the first back-up copy was created. In the present embodiment, the comparison involves a comparison of the name, size, modification date and attributes of the selected configuration files. In the present embodiment, the configuration files scanned at start-up are the AUTOEXEC.BAT, CONFIG.SYS and SYSTEM.INI files. In an alternative embodiment other selected configuration files could be included in the scan at start-up. When changes are detected through the compare, the user is prompted of the changes (using a screen display menu). The user is then prompted to verify proper computer system operation using the existing computer system configuration. The next time the computer is started, the user is queried whether system operation was proper; and the user is prompted with a screen display to indicate whether the user desires to keep the existing system configuration because the system is operating properly or to restore the system configuration to the state that existed when the first back-up copy was created.

If the user indicates that the computer system did not operate properly with the existing system configuration, and if the user indicates that the system configuration should be restored, the user is given the opportunity to select which files to restore from a list of configuration files which have changed. The user can select the individual files that will be restored during the restoration operation or can select to have all configuration files restored. The existing version of the files selected by the user are stored in an undo set on the computer data storage media, and then the system configuration is restored to the state of the first back-up system configuration.

Once the configuration is restored to the first back-up system configuration, the next time the computer is started, the user is prompted with a screen display to verify proper computer system operation with the restored configuration. The next time the computer is started, the user is queried with a screen display to indicate whether the computer system operated properly or whether the user desires to undo the restore operation. If the user indicates that the computer operation was not proper with the restored operation, the user can then elect to undo the restore operation, in which case the restore operation is undone by replacing the existing computer system configuration with the configuration in the undo set. If the user indicates that operation is proper with the restored configuration, no further action is taken.

If the user indicates that he does not yet know if the computer operates properly with the restored configuration, the user will again be prompted to indicate whether the restored configuration operates properly the next time the computer is started.

In one embodiment, the method also involves monitoring the CMOS non-volatile memory, which stores computer system operation parameters and functions. In this embodiment, the CMOS memory is analyzed to determine if the memory has become corrupted. If the memory has become corrupted, the CMOS memory contents are restored with a back-up copy of the contents of the CMOS memory. In the present embodiment, the CMOS non-volatile memory is considered corrupted if the booting hard disk definition is not found in the CMOS memory.

In the present embodiment, the method operates under the Microsoft® disk operating system ("MS-DOS") or IBM disk operating system ("PC-DOS") at system start-up. Further references to "DOS" refer to MS-DOS and PC-DOS collectively. The system also provides the option of creating a back-up floppy diskette, which can boot the system in the event that the configuration changes are catastrophic and do not allow the computer system to boot properly.

Another aspect of the present invention involves a computer system configuration recovery utility for use in monitoring the computer system configuration and indicating to a user when changes to the configuration are detected. The recovery utility is initialized by backing up the computer system configuration when it is operational. The recovery utility utilizes a plurality of menus which lead the user to restore the configuration if desired. The system has a monitoring module executable from the disk operating system (DOS) which checks selected configuration files to determine if changes have been made to the selected configuration files since the selected configuration files were last backed up by the recovery utility. The system also has a warning module which prompts the user on a computer display that changes are detected by the monitoring module. The computer system further has a restore configuration module, which queries the user via prompts on the computer display screen whether the user desires to restore the backed-up configuration when changes have been detected. The restore configuration module responds to the selections by the user and restores the computer configuration by replacing the existing configuration with the backed-up configuration if the user indicates that such action is desired.

In one embodiment, the computer system recovery utility makes an undo set copy of the existing configuration before restoring the existing configuration with the backed-up configuration. In a further embodiment, the recovery utility further allows the user to undo the restore operation if the computer system does not operate properly with the restored configuration.

As explained, the recovery tool executes from DOS at the initial start-up of the computer, or can be executed from the DOS command line. In addition, the recovery tool provides for the option of making a bootable back-up floppy diskette. Therefore, the recovery tool allows a user to recover from changes to the system configuration, including the user's Microsoft Windows® configuration, when those changes are minor or catastrophic. These and other advantages will become apparent with the following description.

BRIEF DESCRIPTION OF THE DRAWINGS

FIGS. 2, 2A, 3, 4A, and 4B illustrate flowcharts representing the general operation of the configuration recovery tool of the present invention.

DETAILED DESCRIPTION OF THE PREFERRED EMBODIMENTS

Figure 1:
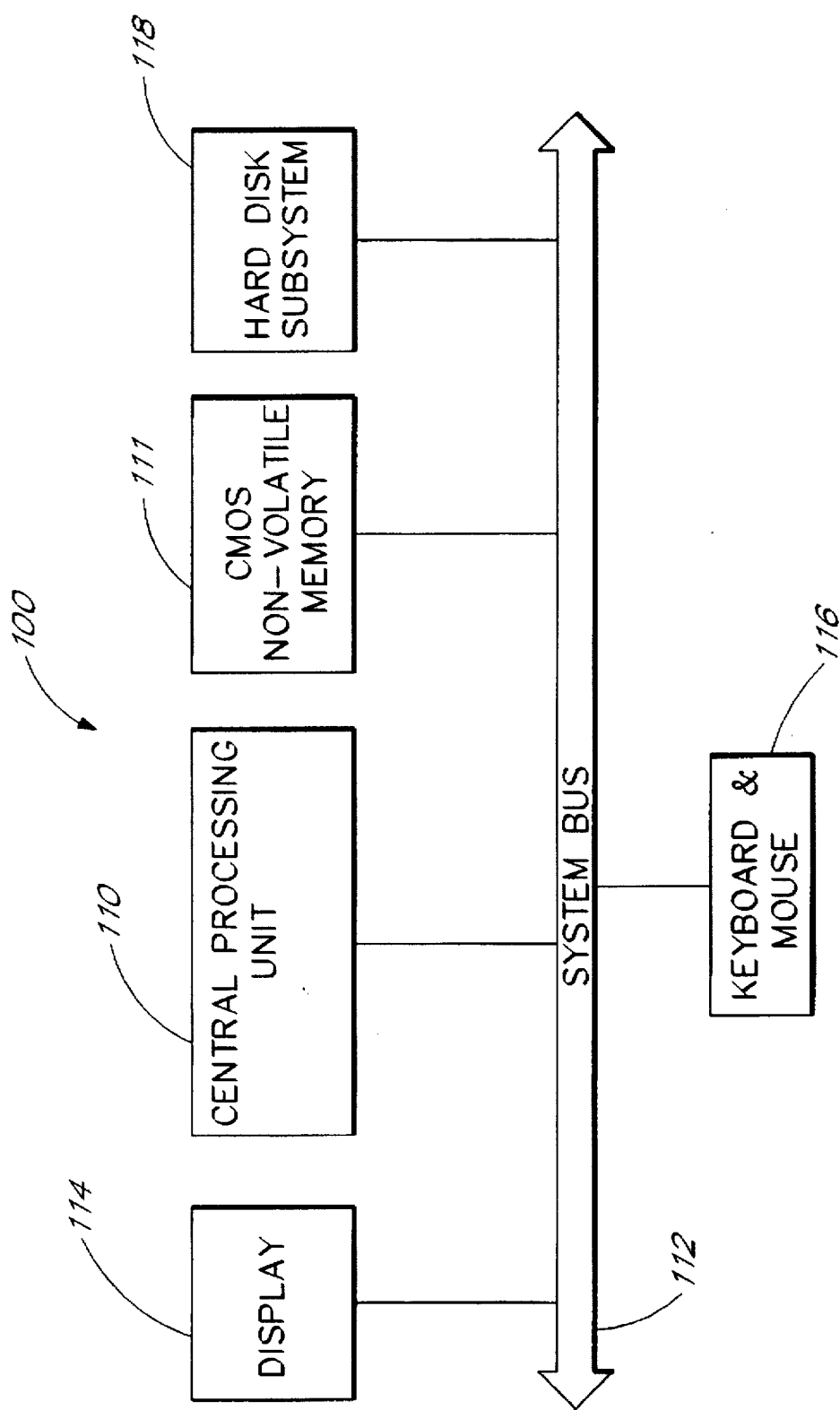
FIG. 1 depicts a general block diagram of a personal computer system used to implement the present invention.

FIG. 1 depicts, in general block diagram form, a personal computer system 100 appropriate for use with the present invention. The computer system, in general, comprises a central processing unit 110 (and supporting resources) coupled to a system bus 112. computer system 100 has a CMOS non-volatile memory 111, a display 114 and a keyboard 116 (and possibly a mouse), as well-known in the art. Preferably, a hard disk subsystem 118 or similar storage media device is also coupled to the system bus 112, as well-known in the art. In one embodiment, the computer system 100 comprises an IBM-compatible 80×86 personal computer operating with MS-DOS version 6.0 (such as an AST Research, Inc. Advantage! brand computers), as well-known in the art. DOS 6.0 is specified because this version of DOS provides a virus scanner which can be activated by the recovery tool. However, other versions of DOS may also be used.

The computer system configuration recovery tool of the present invention is preferably installed on the hard disk 118 for the computer system 100, and can be activated through DOS command line entries or can be activated automatically through a proper entry in the "AUTOEXEC.BAT" file. Placing a command in the AUTOEXEC.BAT file to activate a program during system start-up is well-understood in the art.

The recovery tool of the present invention, in general, monitors several configuration files containing configuration information (i.e., information specifying the computer system's working environment). If changes to the monitored files have been made since the last time the configuration recovery tool recorded the status of these files, the recovery tool indicates to the user that the configuration has changed and provides prompts to assist the user in determining whether the computer system operates properly with the changes to system configuration. If the computer does not operate properly, the recovery tool provides the user with a choice to either totally or partially restore the configuration information to that which existed prior to the latest changes.

In certain circumstances, the recovery tool also checks the CMOS non-volatile memory 111, and also monitors user-selected and/or default files (e.g., application files) upon request by the user. For application files (or other designated files), the recovery tool of the present invention prompts the user of detected changes to the selected application files and also prompts the user of files previously existing, but now missing. With respect to the CMOS non-volatile memory 111, if the recovery tool detects that the CMOS memory 111 contents have become corrupted when it checks the CMOS memory 111, the recovery tool prompts the user to allow the recovery tool to restore the contents of the CMOS memory 111. The general operation of the recovery tool of the present invention is better understood with a detailed discussion of the operations.

To initialize the recovery utility, the user executes the recovery utility from the command line and follows the prompts to allow the recovery tool to make a back-up of the system configuration. Alternatively, the user starts the computer after having installed the recovery tool such that a command to start a "check" routine of the recovery tool is present in the AUTOEXEC.BAT file on the hard disk from which the computer system boots. After installation, the recovery tool informs the user that the recovery tool has been installed and prompts the user with an option to allow the recovery tool to save the current computer configuration information if the computer is operating properly. In a preferred embodiment, the recovery tool saves all configuration files and stores information about the name, date (including time), size and attributes (e.g., the archive file bit, read-only bit, system file bit, hidden file bit, and any other attributes associated with the file). The name, date, size and attributes are hereinafter referred to as the "status" of a file. In the present embodiment, the recovery tool stores the status of the present AUTOEXEC.BAT, CONFIG.SYS and SYSTEM.INI files in a first reference file created by the recovery tool. The recovery tool also stores the content of the AUTOEXEC.BAT, CONFIG.SYS and SYSTEM.INI files in a separate reference file. The recovery tool also stores the status of all files present on the hard disk 118 (and all other local hard disks) of the computer system 100 with .INI, .CFG and .GRP file extensions in the first reference file (or an additional reference file in an alternative embodiment). The content of all files with .INI, CFG, and .GRP extensions are stored in a reference file separate from the reference file storing the status of these files. In the present embodiment, the content of the files with .INI, .CFG, and .GRP file extensions is stored in the same reference file as the content of the AUTOEXEC.BAT, CONFIG.SYS and SYSTEM.INI files. The .GRP, .INI, and .CFG file extensions are well-understood in the art to designate files which contain configuration-type information. In one embodiment, the files in which the status and contents of the configuration files are stored are sequential files. For instance, in the present embodiment, the recovery tool stores the status of the AUTOEXEC.BAT, SYSTEM.INI and CONFIG.SYS files together in a single file. In one embodiment, the recovery tool stores the status of the .CFG, INI and .GRP files in the same file with the AUTOEXEC.BAT, SYSTEM.INI and CONFIG.SYS files. In addition, the recovery tool stores the status of a number of application files in a single sequential file. The application files for which this information is stored are files which have file extensions which are specified as default by the recovery tool (files with pre-defined file extensions) or extensions which are provided by the user as files to be monitored. In the present embodiment, the recovery tool does not store the complete application files, but merely the status (i.e., the name, modification date (including time), size and attributes) for the files. In one embodiment of the present invention, the recovery tool also stores a copy of the contents of the CMOS non-volatile memory 111 when the recovery tool is initialized.

In the present embodiment, once the recovery tool is initialized, the recovery tool automatically monitors AUTOEXEC.BAT, CONFIG.SYS and SYSTEM.INI files each time the computer system is started. In an alternative embodiment, the recovery tool could monitor additional selected files for changes each time the computer is started. If the user starts the recovery tool from the command line, the user is provided the option to invoke any of the functions available through the recovery tool.

Figure 2A:
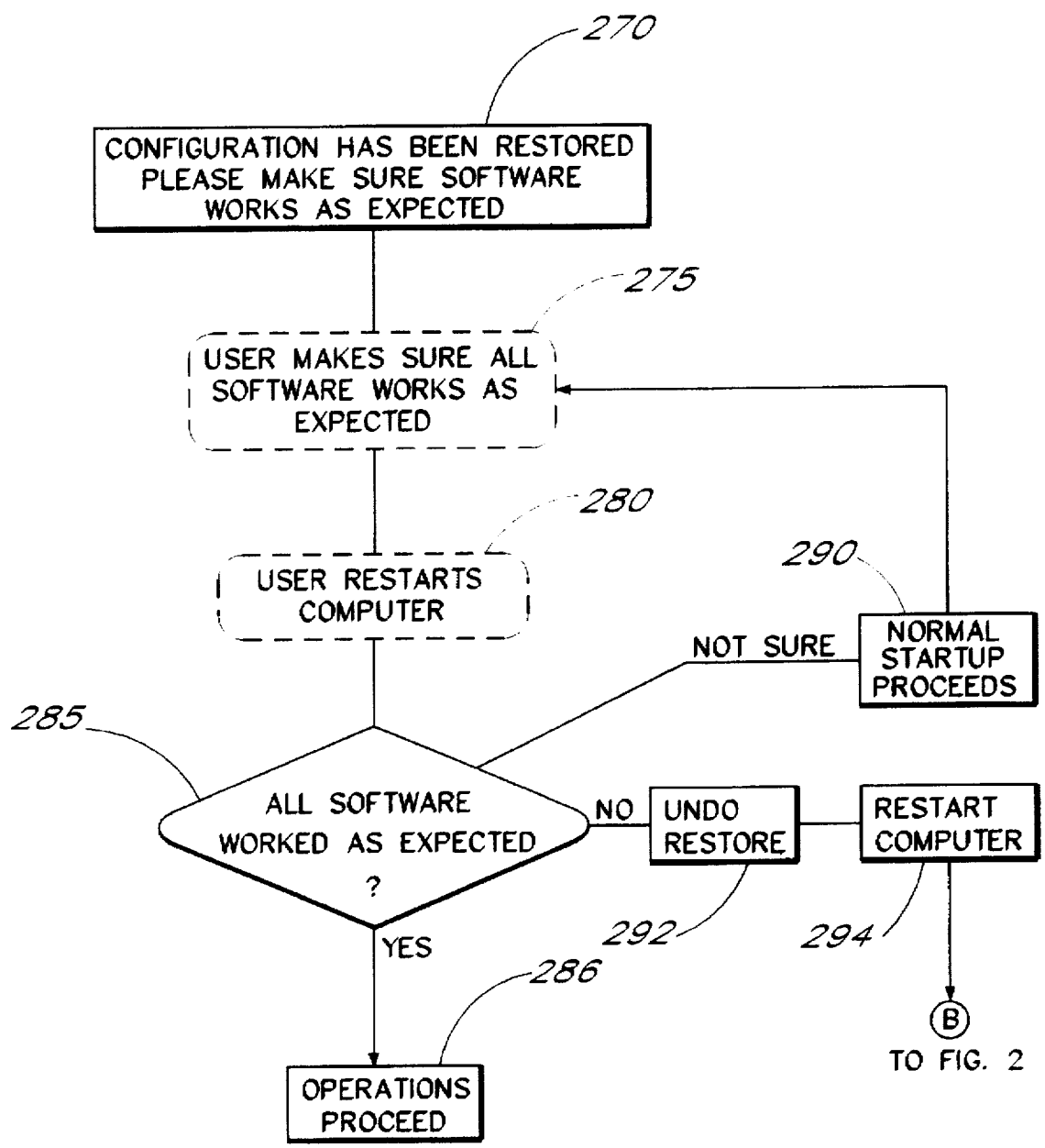

FIGS. 2 and 2A depicts a general operational flowchart for the recovery tool of the present invention. By placing an entry to invoke a "check" routine of the recovery tool in the AUTOEXEC.BAT file typically present on the computer hard disk 118, a first routine of the recovery tool is activated each time the computer is started. The first routine is hereinafter referred to as the "check" routine. This routine is represented in a decision block 200 of the flowchart of FIGS. 2 and 2A. The configuration check routine compares the present configuration for the computer with the previously 'stored information to determine if any changes have occurred. The storage of the previous configuration is represented in an activity block 201, before the recovery tool enters the decision routine 200.

In the present embodiment, the check routine determines if the AUTOEXEC.BAT, CONFIG.SYS, and SYSTEM.INI files have changed since the last configuration backup. This is accomplished by comparing the status of these files with the contents of the recovery tool reference file which stores the backed-up status of these three files. In addition, one or more of these files may not exist, or may not have existed during the last backup. If any of these three files did not exist but does exist when the check routine is executed, or if any file did exist and does not exist when the check routine is executed, this is considered changed, and the recovery tool notifies the user.

In the present embodiment, the recovery tool does not automatically check the other .INI, .CFG and .GRP files for changes, nor does it automatically check for changed or missing designated application files. However, additional files could be included in the automatic check during startup in an alternative embodiment. As explained above, the recovery tool determines if changes have occurred by comparing the status of these files with the recovery tool reference file that stores the status of the corresponding backed-up files.

Figure 5:
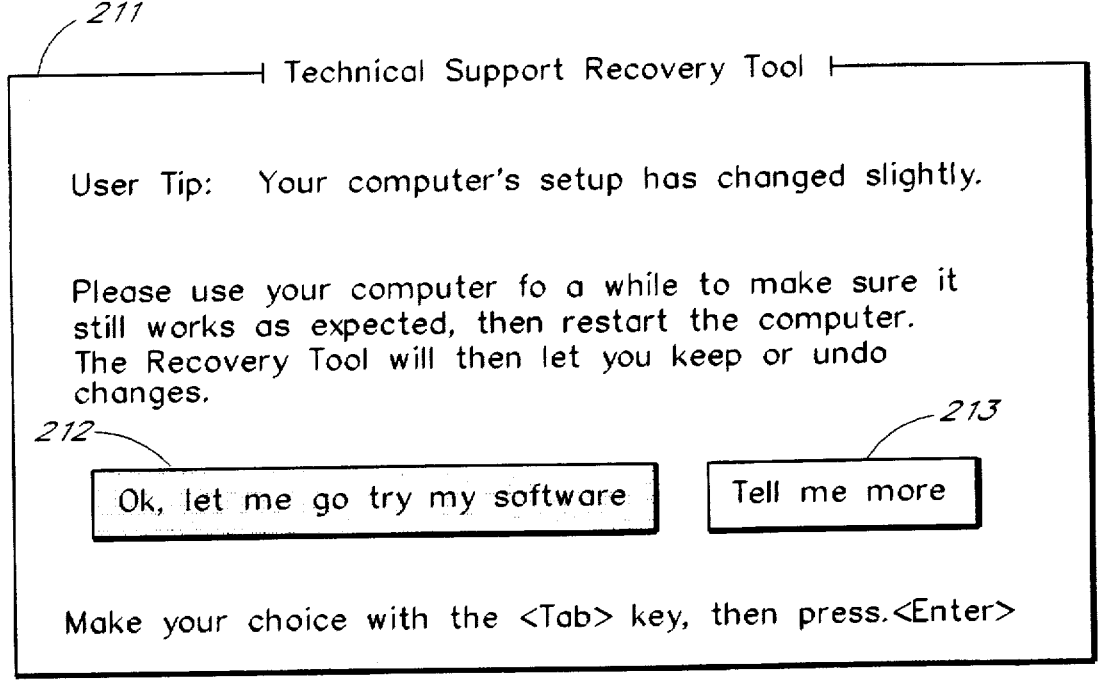
FIGS. 5–15 depict exemplary screen displays and menus for the present embodiment of the configuration recovery tool

If no change (decision block 200) has occurred in configuration files since the last configuration backup, the system start-up operations continue through the AUTOEXEC.BAT file, as well-known in the art, and as represented in an action block 205. If the check routine determines that changes have occurred in configuration files, the recovery tool warns the user of the changes and prompts the user to check all software for proper operation, as represented in an action block 210. Along with the warning and prompt to check all software, the recovery tool gives the user the opportunity to obtain more information on the recovery tool. The display screen 211 of FIG. 5 is one possible embodiment of an exemplary screen to prompt the user of changes to the system configuration. In summary, the condition that exists when this screen is displayed is if the configuration has changed, but the user has not been previously notified of any detected changes.

As can be seen in the display screen of FIG. 5, the user can either select (with a mouse or with the tab key) a text box 212 with the phrase "Ok, let me go try my software" or a text box 213 with the phrase "tell me more" in order to make a selection. The shading in the text box 212 in FIG. 5 with the phrase "Ok, let me go try my software" indicates the current selection. Pressing the tab key selects between the two boxes 212, 213. When the user makes the selection, the user presses <ENTER>. Alternatively, the user selects either box 212, 213 by clicking a mouse on the desired text box.

If the user selects the box 213 requesting additional information, the recovery tool displays information about its operation (commonly known as "help"). Obtaining additional information on the recovery tool is represented in an action block 215 in FIG. 2.

If the user selects the text box 212, the user determines whether all software is working properly, as represented in an action block 220. When the user restarts the computer, as represented in an action block 225, the recovery tool prompts the user in a different manner and allows the user to invoke certain actions as further described with reference to the flowchart of FIG. 2. It should be noted that the action blocks 220 and 225 of FIG. 2 represent actions on the part of the user rather than by the recovery tool. The action blocks 220 and 225 are merely provided to assist in understanding the recovery tool flow of operation. It should further be understood that if further changes are made to the configuration during the computer operation represented in action block 220 (i.e., when the user is verifying proper operation of the software), the recovery tool again notifies the user of the change (action block 220) and displays the prompt of FIG. 5.

The next condition depicted in the flowchart of FIG. 2 is if the configuration has changed, and the user has been notified previously. Now the user may back up the new configuration information if the computer operated properly, or the user may restore the old configuration if the computer system operates improperly.

Figure 6:
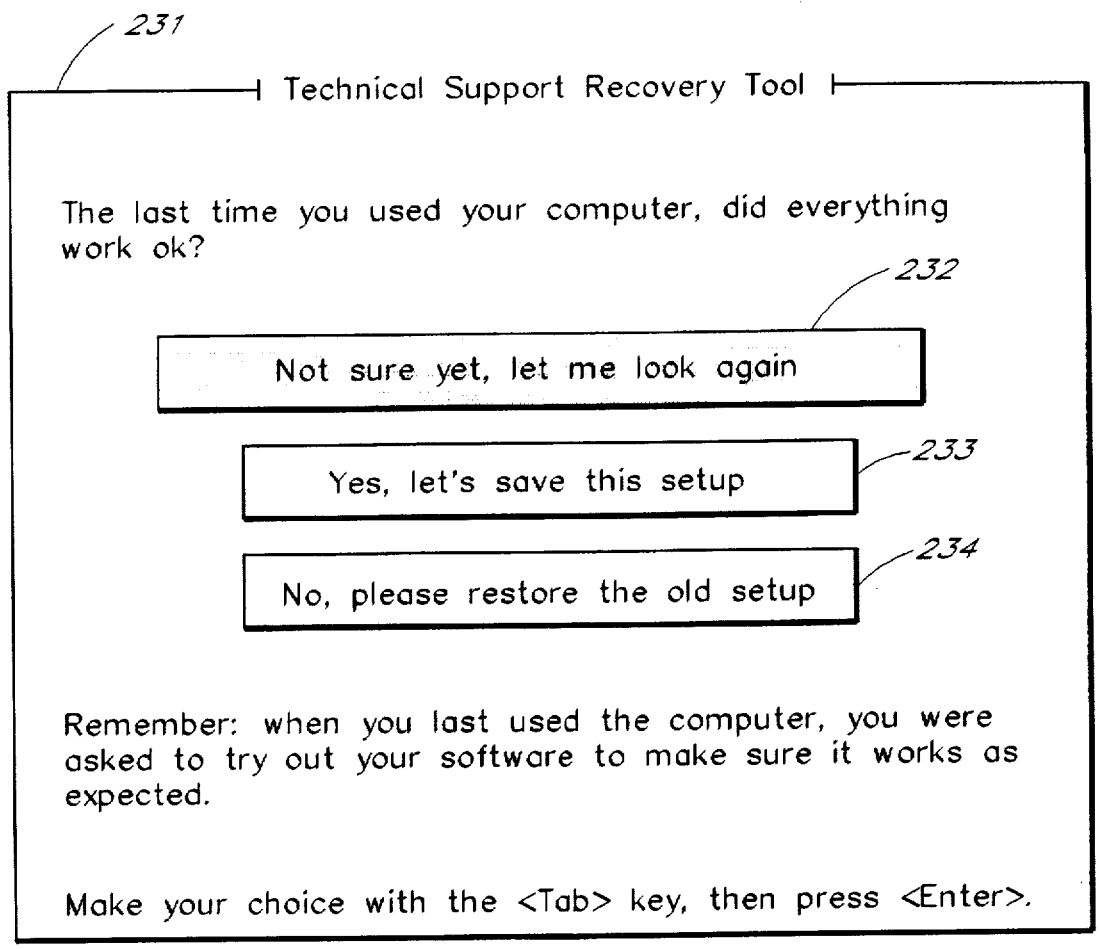

Once the user restarts the computer (action block 225), the recovery tool prompts the user to indicate whether the software worked as expected, as represented in a decision block 230. An exemplary display screen 231 in accordance with one embodiment of the present invention is depicted in FIG. 6. As depicted in the display 231, the recovery tool asks the user to indicate whether the last time the computer was operated, everything functioned properly. The prompt provides three choices to the user: (1) a text box 232 allows the user to indicate that the user is not yet sure, (2) a text box 233 allows the user to indicate that the computer operated properly and to initiate a save of the current computer configuration, and (3) a text box 234 allows the user to indicate that the computer did not operate properly and to initiate a restore of the old configuration.

If the user selects the text box 232 (the user is not yet sure), the computer continues its start-up operations without any changes, as represented in an action block 235 (FIG. 2). Again the user verifies proper operation of the software (action block 220) and restarts the computer (action block 225). When the user restarts the computer, the recovery tool again asks the user to indicate whether all software worked as expected (decision block 230).

Figure 7:
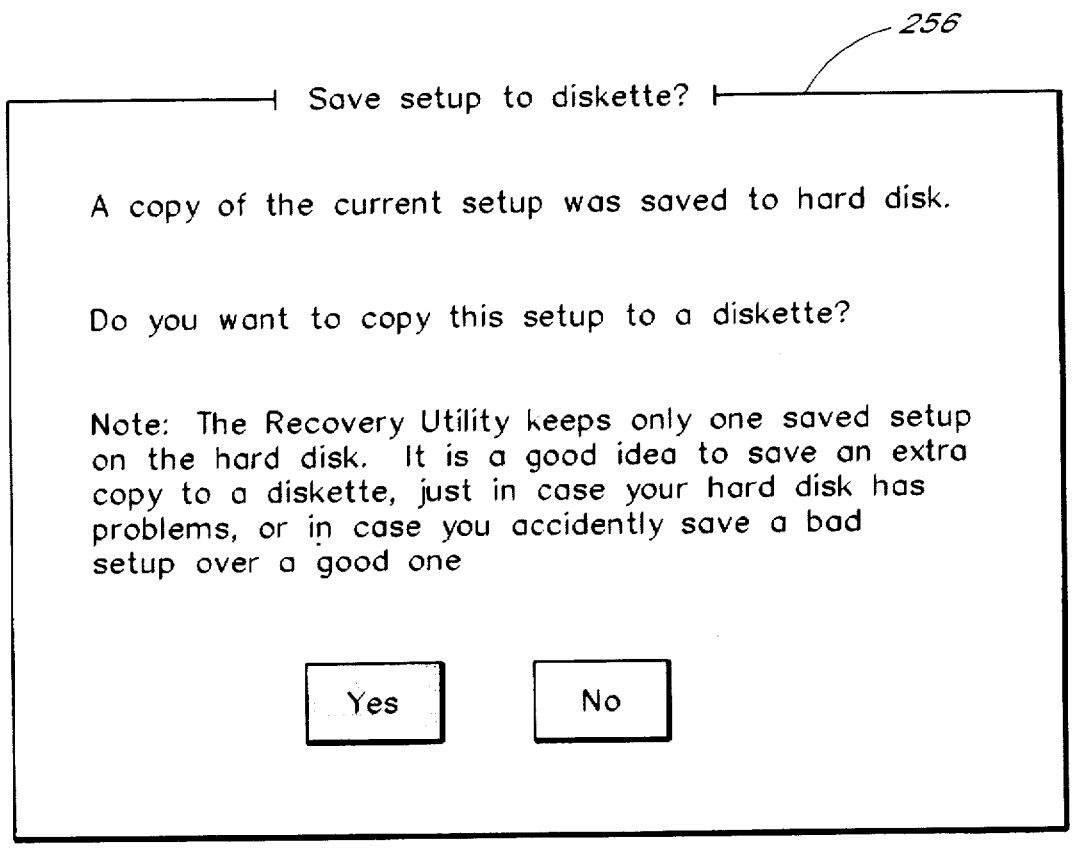

If the user indicates with text box 233 (FIG. 6), that the software operated as expected, the recovery tool saves the current configuration information (i.e., the configuration information incorporating the new changes), as represented in an action block 250 (FIG. 2). The recovery tool also queries the user whether a self-booting floppy diskette is desired, as represented in a decision block 255. One exemplary display screen 256 to query the user about making a back-up diskette is depicted in FIG. 7. If the user does not desire a self-booting diskette as a backup, normal start-up continues, as represented in an action block 260. If the user desires a self-booting, back-up diskette, the recovery tool prompts the user through the steps to create a back-up diskette containing the new configuration information, as represented in an action block 260. After the back-up floppy diskette is created, normal start-up operations continue (action block 260).

In making the bootable back-up diskette, the recovery tool formats the disk and copies the recovery tool files to the diskette, along with the configuration files, which contain the operating parameters for the computer system. With respect to application files which are selected for backup, only a file which contains the status of these files is stored on the back-up floppy. In the present embodiment, whenever the user boots the computer with the back-up diskette, the recovery tool checks the CMOS for the definition of drive 0 (the booting drive). If the recovery tool does not find drive 0, the recovery tool indicates to the user that the CMOS is likely corrupted. Restoring the CMOS is discussed in greater detail below.

Figure 10:
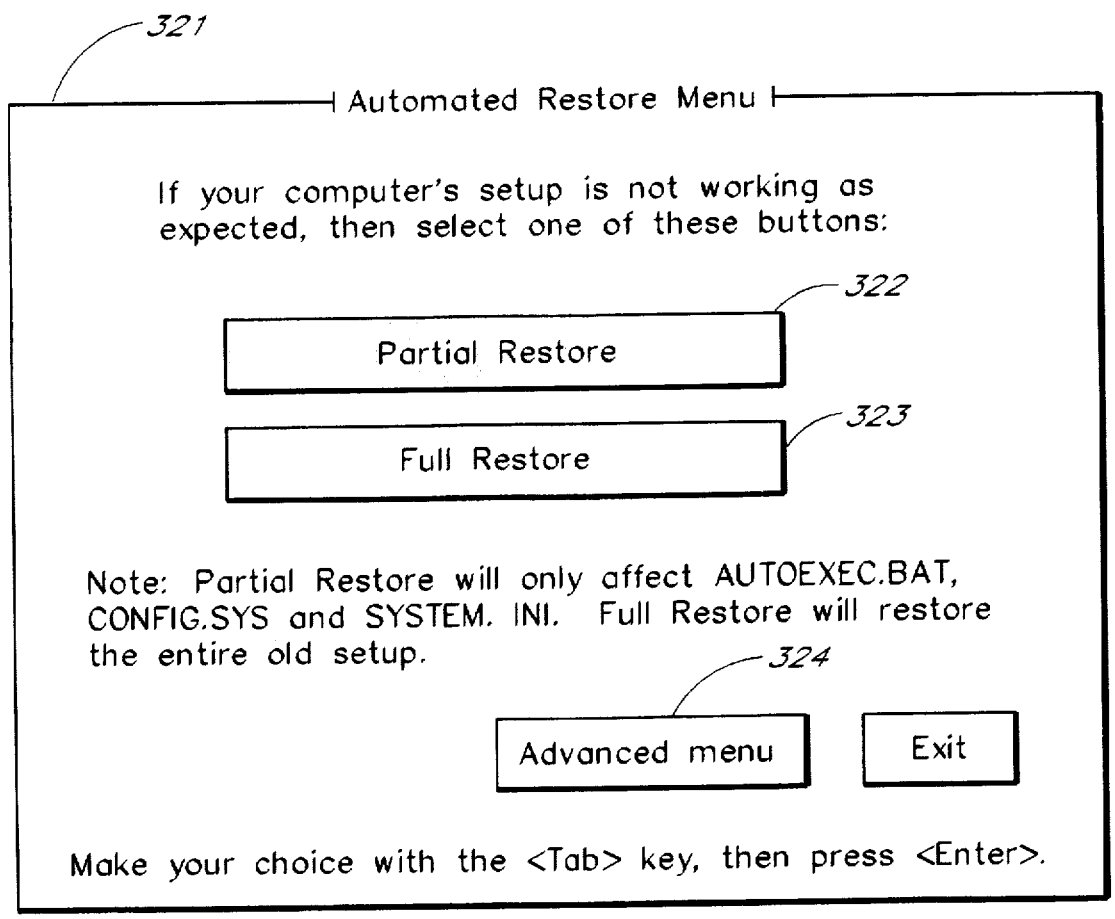

If the user indicates at decision block 230 (FIG. 2) that the software did not work as expected (text box 234, FIG. 6), the check routine activates the restore operations routines for the recovery tool, as represented in an action block 240. The user is then presented an AUTOMATED RESTORE MENU with a prompt which allows selection of a partial restore operation, a full restore operation, access to an ADVANCED MENU or the option to exit the recovery tool. An exemplary AUTOMATED RESTORE MENU 321 is depicted in FIG. 10. These options are discussed in detail below in reference to FIG. 3, which illustrates a flowchart of restore operations.

Figure 8:
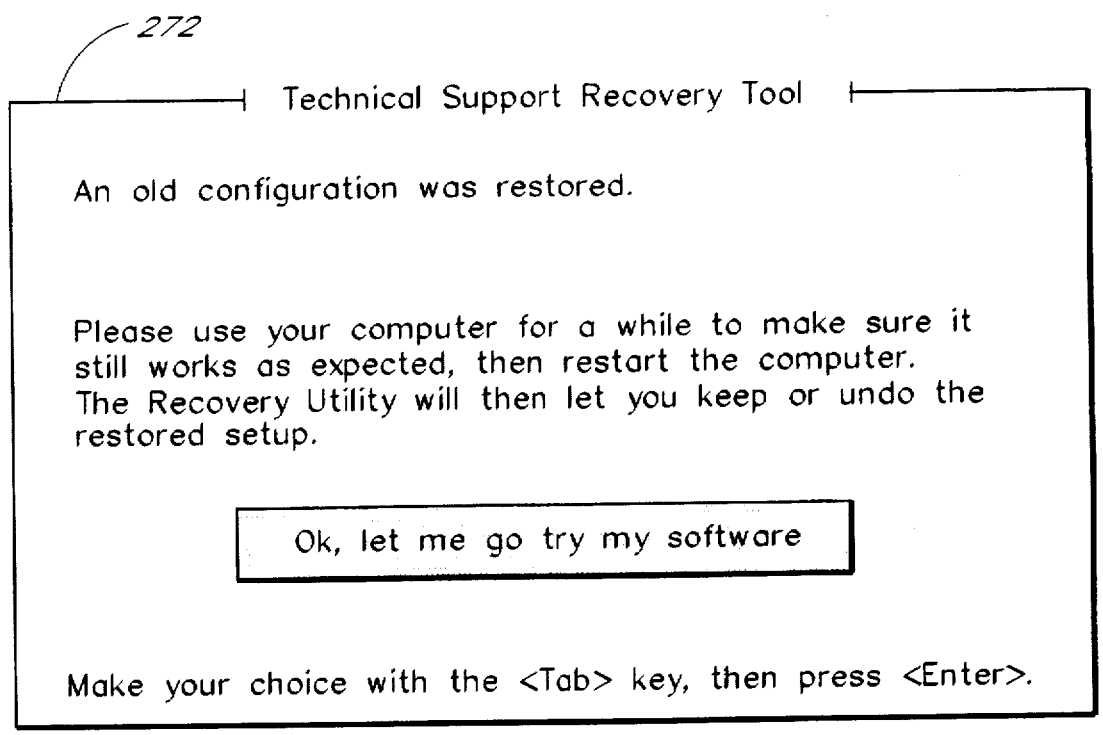

If a restore operation is selected, operations proceed as depicted in FIG. 2A. When the computer restarts, the recovery tool has not yet notified the user that the configuration was restored. Therefore, the recovery tool prompts the user that the recovery tool has restored the computer to the previous configuration, as represented in an action block 270 of FIG. 2A. An exemplary prompt according to the present invention is depicted in a screen display 272 of FIG. 8. The user then makes sure that all software works as expected, as represented in an action block 275 (FIG. 2A).

Figure 9:
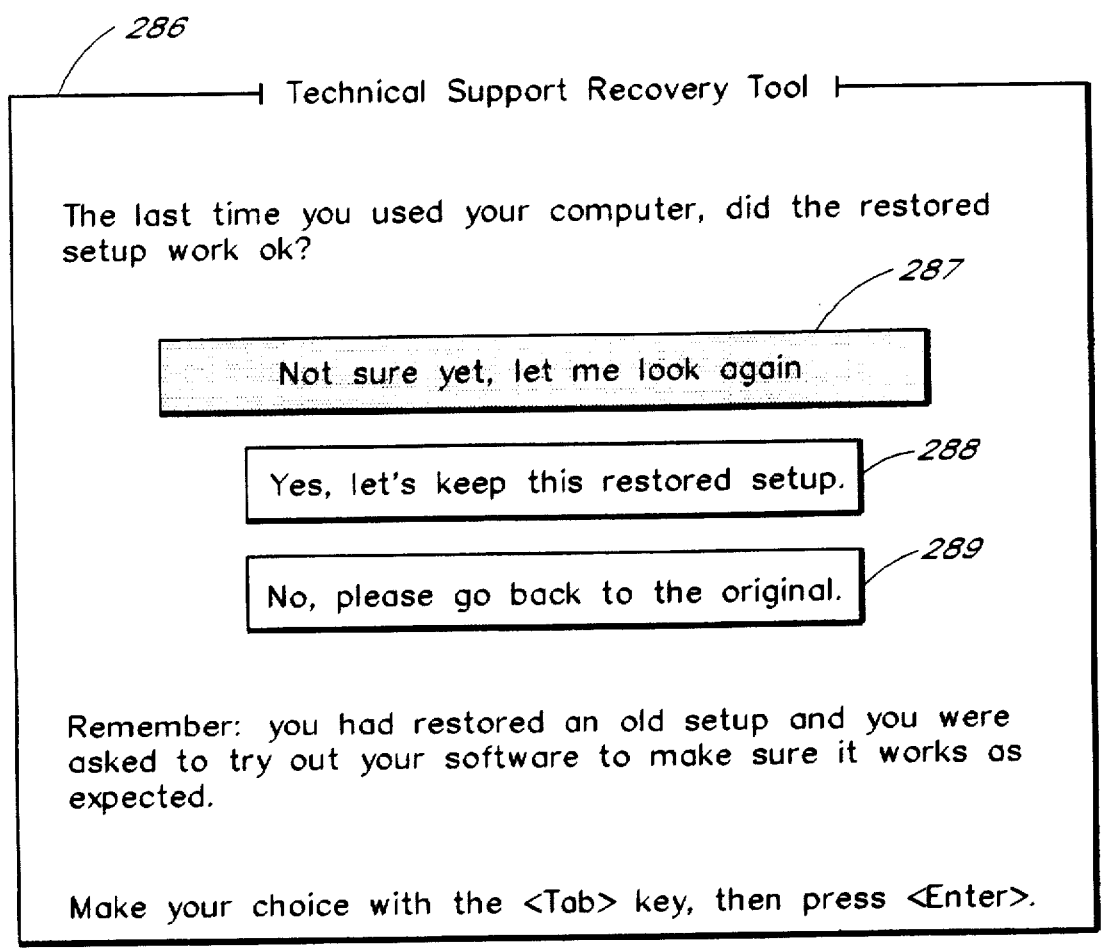

When the user restarts the computer, as represented in an action block 280, the recovery tool queries the user whether all software worked as expected using the restored setup, as represented in a decision block 285. An exemplary prompt at this stage is depicted in a screen display 286 of FIG. 9. The screen display 286 provides three options for the user: (1) the user can indicate with a text box 287 that he is not yet sure whether the computer operates properly, (2) the user can indicate with a text box 288 that the computer did operate properly and that the configuration should remain as it exists, and (3) the user can indicate with a text box 289 that the computer software did not operate properly and that the restoration should be undone (configuration changed back to the original).

If the user indicates that he is not yet sure about the operation of the computer, normal startup continues, as represented in an action block 290 (FIG. 2A). The user again has the opportunity to verify proper software operation, as represented in the action block 275. When the computer is restarted by the user, as represented in the action block 280, the user is again prompted with the display screen 286 of FIG. 9.

If the user indicates with the text box 288 (FIG. 9) that the software worked as expected (decision block 285), then the configuration remains as it exists, and operations proceed, as represented in an action block 286. Control returns to the computer operating system upon exit. Upon restart of the computer, the recovery tool takes action starting at the beginning of the flowchart of FIG. 2.

If the user indicates with the text box 289 that the software did not operate as expected with the restored configuration (decision block 285, FIG. 2A), the recovery tool returns the configuration to the previous state, as represented in an action block 292 (FIG. 2A). The recovery tool then restarts the computer, as represented in an action block 294. When the computer restarts, the user is again notified of the configuration change, as represented in an action block 210 (FIG. 2 via the continuation point B). Operation proceeds as explained above starting at action block 210 of FIG. 2.

With each level of the screen views presented above, the recovery tool creates a record of the messages that the user has been prompted with. For instance, when the recovery tool detects changes and prompts the user about the changes by displaying the first screen discussed above, the recovery tool records that the user has been prompted with the corresponding display prompt. Then, the next time the user starts the computer system, the recovery tool prompts the user with the next appropriate display screen discussed above, giving the user the option to restore the old configuration, save the new configuration or continue to verify proper software operation. If the user elects to have the old configuration restored, the recovery tool again records this selection so that the next time the user starts the computer system, the recovery tool prompts the user with the display screen that queries the user whether the restored configuration works, and so forth.

The screens described above represent screen displays for the present embodiment of the present invention from the perspective of the user of the recovery tool. The flowchart of FIG. 2 is representative of the general operation with the check routine being executed from the AUTOEXEC.BAT file each time the computer is started. Additional detail about the operation of the recovery tool is now described.

Restore Operations

Figure 3:
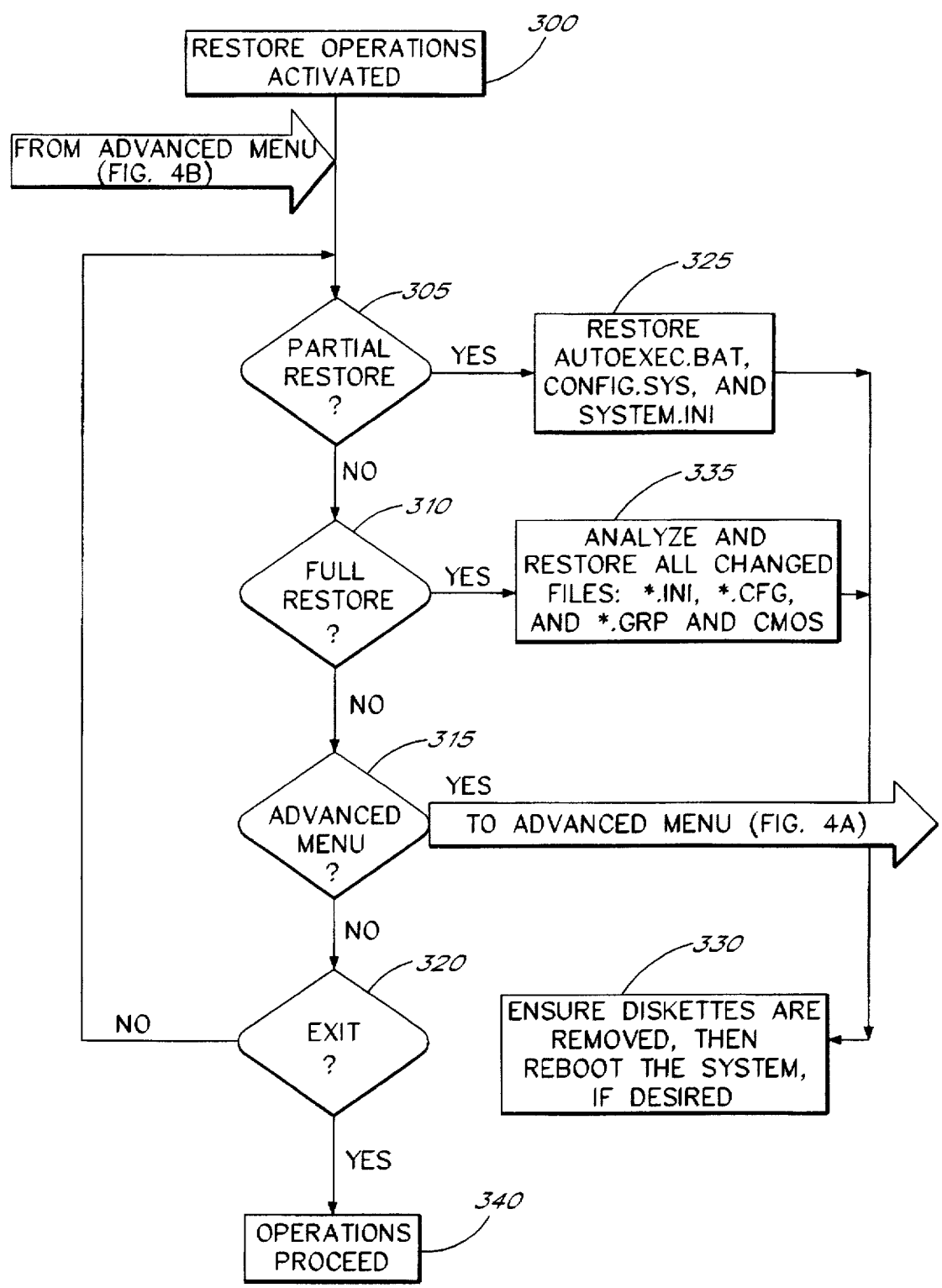
Figure 4A:
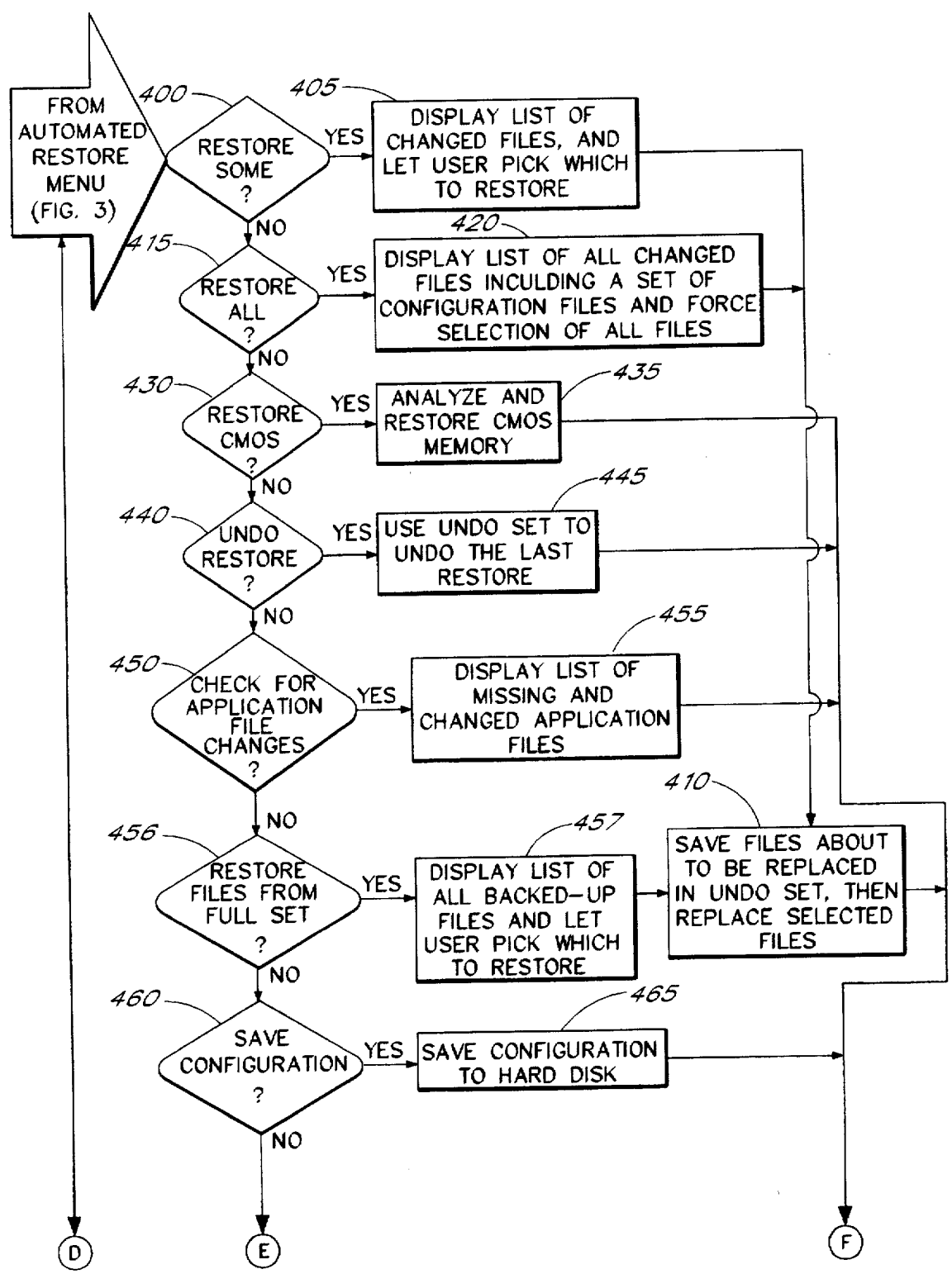
Figure 11:
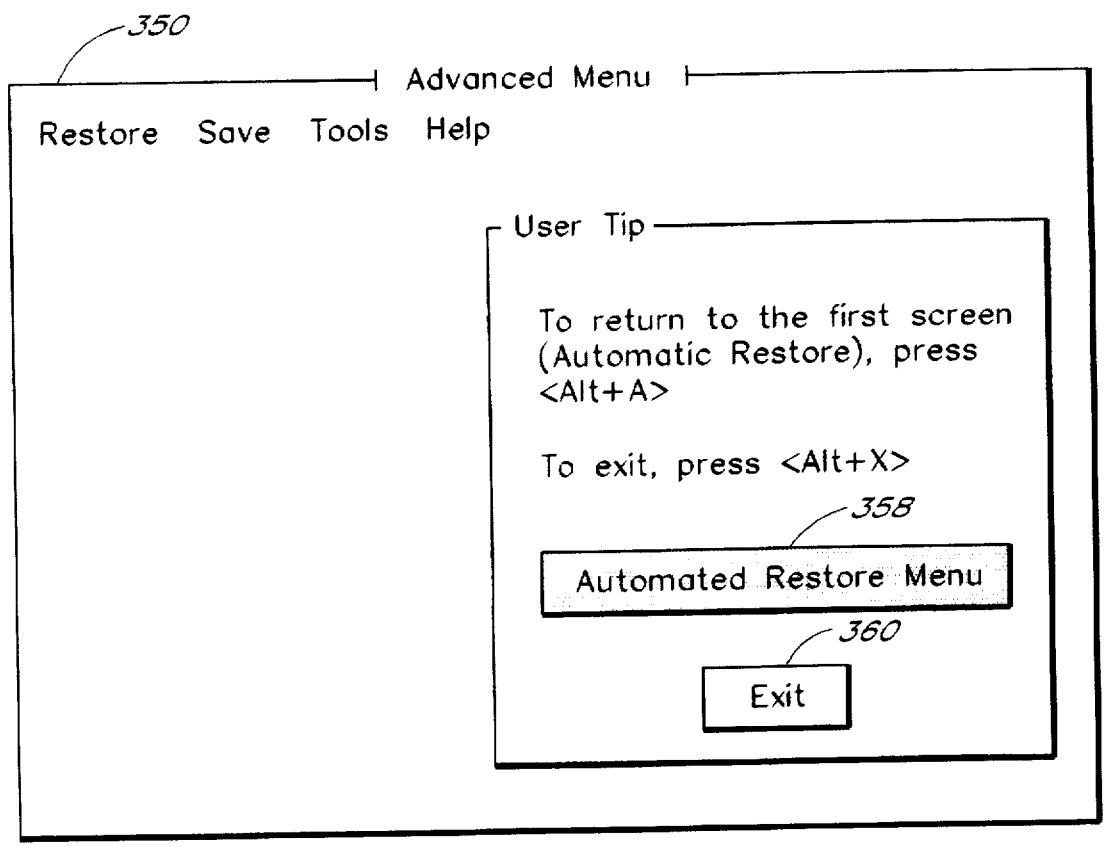

When a user elects to restore previous configuration information, the user is provided with various alternative ways to carry out the restore operation. The restore operations are represented, in general, in the flowcharts of FIGS. 3-4. FIG. 3 depicts a basic flow chart of automatic restore operations available to the user via the AUTOMATED RESTORE MENU 321 of FIG. 10. The recovery tool also provides the opportunity to have more control over the restore operations through art ADVANCED MENU 350 depicted in FIG. 11. ADVANCED MENU operations are represented in the flowcharts of FIGS. 4A and As represented in an action block 300 of FIG. 3, the restore operations are activated, and the recovery tool determines, through menus and prompts, various options available to the user. The restore operations are activated either through the restore action block 240 of FIG. 2, or the recovery tool restore operations can be activated directly from the DOS command line by the user typing a command to start the restore operations routines of the recovery tool. The various options for the AUTOMATED RESTORE MENU are represented in general in decision blocks 305, 310, 315 and 320 of FIG. 3. It should be noted that in the present embodiment, the options represented in the decision blocks are provided through a series of menus rather than a series of linear operations. The menu 321 of FIG. 10 depicts one possible embodiment of an exemplary AUTOMATED RESTORE MENU 321 provided to the user to select restore operations. The partial restore and full restore decision blocks 305 and 310 represent automatic restore operations controlled by the recovery tool. The user can select either of these operations with the text boxes 322 and 323 of the screen display 321 of FIG. 10.

If a partial restore is selected by the user (decision block 305), the recovery tool automatically restores the AUTOEXEC.BAT, CONFIG.SYS, and SYSTEM.INI files to the last backed-up version of these files, as represented in an action block 325. The user selects a partial restore via the text box 322 of the AUTOMATED RESTORE MENU 321, which is displayed on the computer display 114 (FIG. 1). However, before these files are replaced, the recovery tool saves copies of the existing AUTOEXEC.BAT, CONFIG.SYS, and SYSTEM. INI files in art UNDO set (file) in order to allow the recovery tool to undo the restore if necessary.

After the files are restored, the recovery tool ensures that any floppy diskettes are removed and then reboots the system, if desired by the user, as represented in an action block 330. Alternatively, the user may simply elect to exit without rebooting the system. In addition, if the recovery operation is executed from a DOS window within Microsoft Windows®, the recovery tool does not reboot the system. When the recovery tool is running under Windows®, instead of rebooting as represented in the action block 330, the recovery tool prompts the user that any changes from the restore operation take effect on the next system boot. Finally, if the recovery tool is executing from a bootable recovery tool floppy diskette, the user is not provided with the option to exit directly to the operating system; the recovery tool automatically reboots the system. When the computer is restarted, control proceeds starting at the beginning of the flowchart of FIG. 2A. The operations of FIG. 2A are described in detail above.

The user may alternatively select to perform an automatic full restore of the computer system, as represented in the decision block 310 (FIG. 3). The user selects a full restore by selecting the full restore text box 323 of the AUTOMATED RESTORE MENU 321 illustrated in FIG. 10. If this option is selected, the system restores the AUTOEXEC.BAT, CONFIG.SYS, and SYSTEM.INI files and all other files with .INI, .CFG, and .GRP file extensions, as represented in an action block 335. The recovery tool also restores the CMOS non-volatile memory 111. As well-understood in the art, files that have a .CFG extension generally contain application software configuration information. Similarly, files with a .GRP extension are well-known as "group" files for Microsoft Windows®. In one embodiment, the recovery tool also queries the user whether a restore of the CMOS nonvolatile memory 111 is desired before restoring the CMOS nonvolatile memory 111.

As with a partial restore, before the files are restored to their last-backed-up state, the recovery tool makes an UNDO set copy of all the files which are to be replaced during the restore. The UNDO set provides for the option of undoing the restore operation if the restore does not return the computer to proper operation.

From the AUTOMATED RESTORE MENU 321 of FIG. 10, the user can enter the ADVANCED MENU 350 (FIG. 11) of the recovery tool by selecting the ADVANCED MENU text box 324 of the AUTOMATED RESTORE MENU 321 (FIG. 10). The corresponding computer operation is represented in a decision block 315 (FIG. 3). The ADVANCED MENU 350 provides additional control for the user, as explained below in connection with the flowchart of FIGS. 4A and If the user does not wish to execute any restore operations from the AUTOMATED RESTORE MENU 321, the user elects to exit the recovery tool without taking any action by selecting the "EXIT" text box of the AUTOMATED RESTORE MENU 321. This function is represented in the decision block 320. In this case, the recovery tool exits, and computer operations proceed, as represented in an action block 340.

Figure 4B:
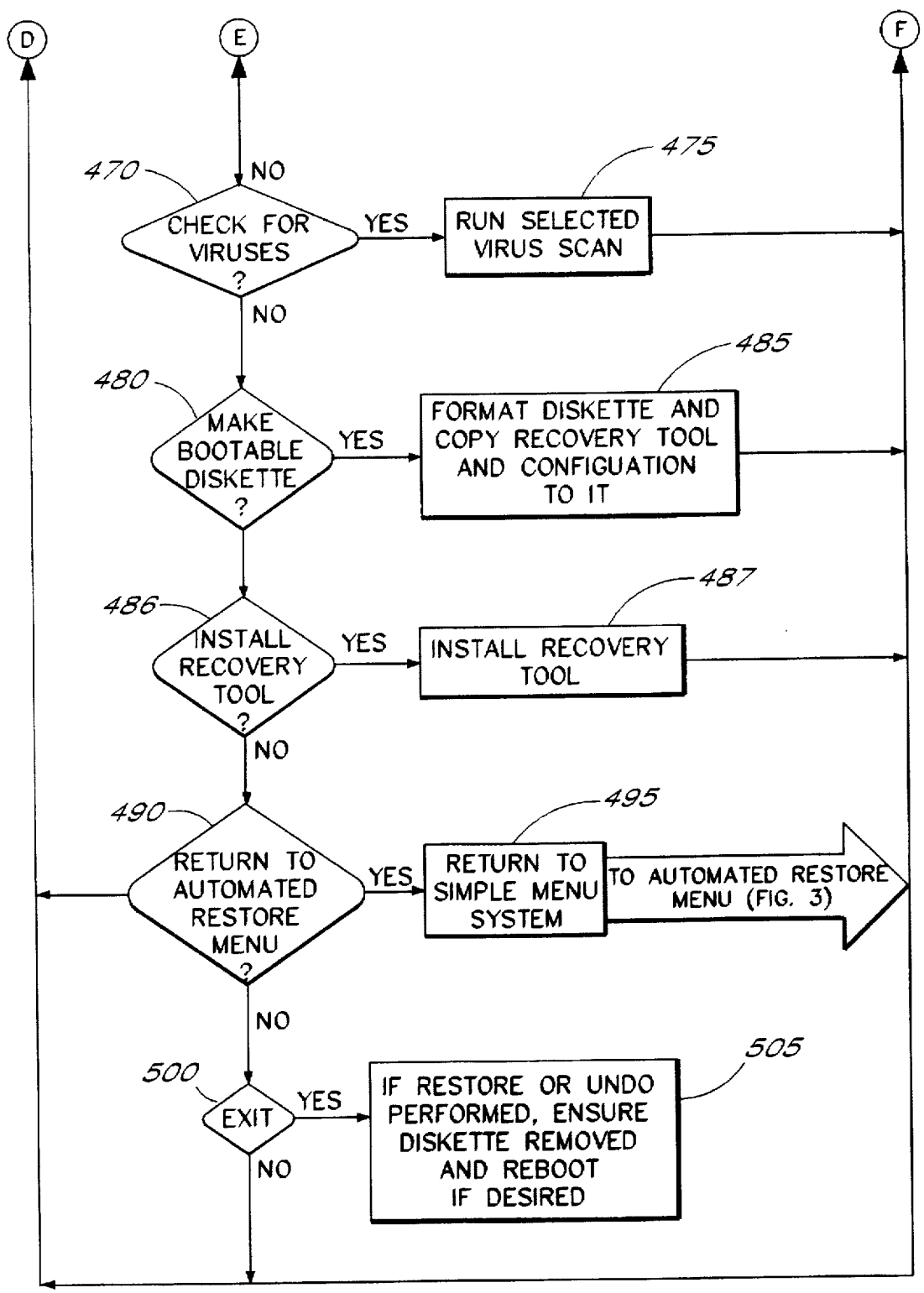

FIGS. 4A and 4B represent ADVANCED MENU functional operations for the recovery tool. If the user elects to utilize the ADVANCED MENU 350 for recovery tool operation, the user has several options represented in an exemplary ADVANCED MENU 350 depicted in FIG. 11. As with the previous menus, the ADVANCED MENU 350 is displayed on the computer display 114. As with the previous flowcharts, the flowcharts of FIGS. 4A and 4B represent the computer operational functions that can be selected via the ADVANCED MENU 350. The flowcharts of FIGS. 4A and 4B are related via the continuation points D, E, and F.

Figure 12:
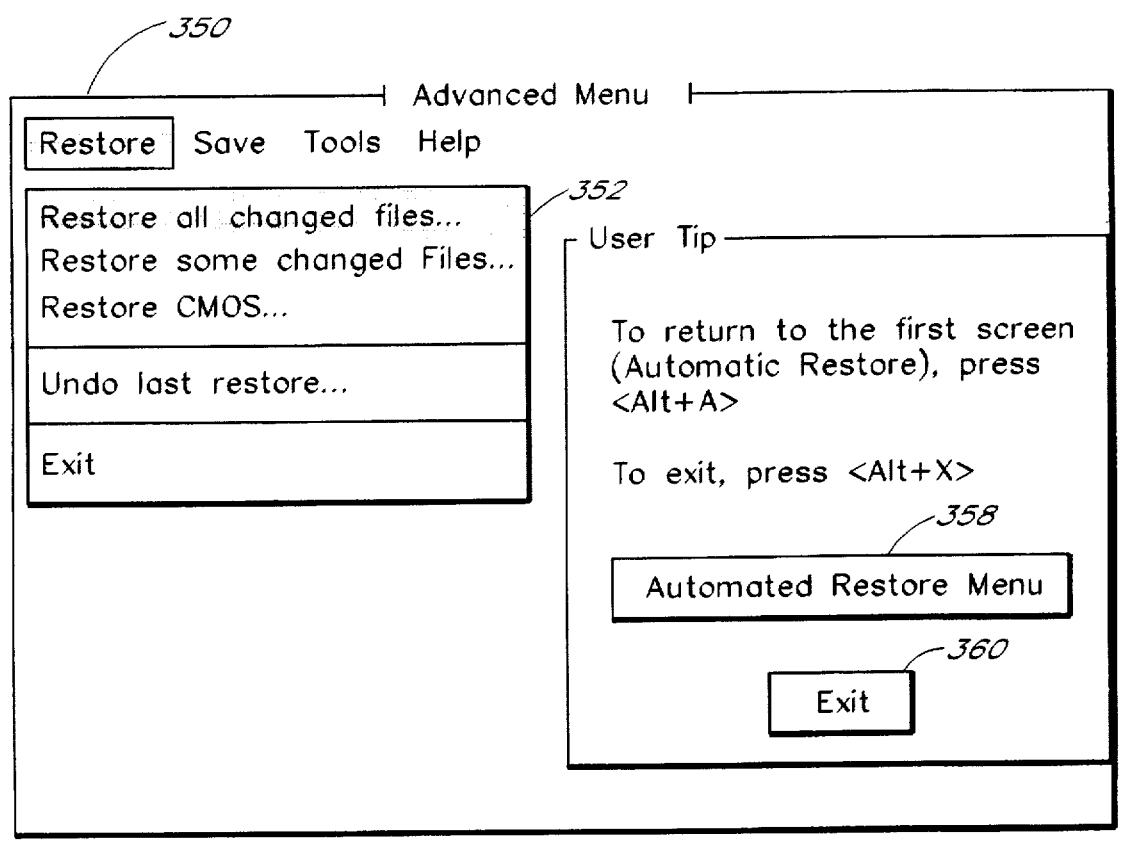

If the user wishes to execute restore operations from the ADVANCED MENU 350, the user activates a pull down restore menu 352 in the ADVANCED MENU 350, as depicted in FIG. 12. The user may elect to restore only some of the files that have changed, as represented in a decision block 400. The user activates this operation by selecting the "Restore some files" option in the restore menu 352. If the user elects to restore some files, the recovery tool displays a list of files that have changed and allows the user to select which of the files, if any, are desired for restoration, as represented in an action block 405 (FIG. 4A). In the present embodiment, once the user selects the desired files to restore, the recovery tool automatically saves each file about to be replaced in an UNDO set, and then replaces the files as last backed-up with the recovery tool, as represented in an action block 410. As explained above, storing the files which are about to be replaced provides the option of undoing the restore if the restore does not cause the computer to function as desired.

In a preferred embodiment, prior to replacing any files, the current version of all files about to be replaced are saved in the UNDO set. Then, the files selected by the user are replaced with the files as last backed-up with the recovery tool (action block 410). The ADVANCED MENU 350 then returns to the display 114 to provide additional options. An additional option provided in the ADVANCED MENU is to restore all files that have changed, as represented in an action block 415. If the user selects the "Restore all changed files" option in the restore menu 352 (FIG. 12) of the ADVANCED MENU 350, the recovery tool displays a list of all files that have changed and automatically selects all changed files for replacement, as represented in an action block 420. In addition to selecting all files, the recovery tool prompts the user to indicate whether the CMOS nonvolatile memory 111 (which stores system operating functions, as well-known in the art) should also be restored. As well known in the art, the CMOS memory 111 stores system operating functions and parameters. If this memory becomes corrupted, erroneous computer operation can result.

As with the "Restore some changed files" option in the ADVANCED MENU, the recovery tool saves all files which are about to be replaced in the UNDO set, and then restores the selected configuration files (which in this case is all changed files), as represented in the action block 410. The recovery tool also restores the CMOS memory if restoration is selected. Once the restore operation is complete, the ADVANCED MENU 350 returns to the computer display 114.

A further option available in the restore menu 352 of the ADVANCED MENU 350 (FIG. 12) is to restore the CMOS memory, as represented in an action block 430. The user activates this option by selecting the "Restore CMOS" option in the restore menu 352. Although this is in addition to the option to restore the CMOS provided in the "Restore all files" option discussed above, the function is the same. If the user selects the restore CMOS option, the recovery tool first stores the current contents of the CMOS non-volatile memory 111 in art UNDO file and then replaces the contents of the CMOS memory 111 with a proper set of CMOS data, as represented in an action block 435. The CMOS data restored consists of the CMOS contents last backed up with the recovery tool.

The CMOS restoration can also be activated by the recovery tool upon invoking the recovery tool restore operations routines directly from the command line or by starting the computer with the back-up, recovery tool, self-bootable floppy diskette. In either of these situations, the recovery tool scans the CMOS non-volatile memory 111 for the existence of a bootable hard drive (e.g., the "C:" drive). If no bootable hard drive is defined in the CMOS memory 111, the recovery tool prompts the user about possible corruption of the CMOS memory 111. The recovery tool prompts the user with the suspected problem, and allows the user to activate restoration of the CMOS memory 111 from the warning screen.

Another option in the restore menu 352 of the ADVANCED MENU 350 is to undo the previous restore operation. The user activates this operation by selecting the "Undo last restore" entry in the restore menu 352. The functional computer operation is represented in the decision block 440 of the flowchart of FIG. 4A. As explained above, one of the functions provided by the recovery tool is to allow the user to undo the last restore operation. A user may desire to undo a previous restore, if, for instance, the previous restore did not result in proper computer operation. If the user selects the undo restore option, the recovery tool replaces the files last restored with the files stored in the UNDO set discussed above, as represented in an action block 445. Once the undo operation is complete, the ADVANCED MENU 350 returns to the computer display 114.

In the present embodiment, the recovery tool reboots the computer system upon exiting the tool if a restore was executed or if the computer is booted from a recovery tool bootable floppy diskette. Unless the reboot is after a restore from a recovery tool bootable floppy diskette, before a reboot of the computer, the user is informed that a reboot is about to occur and may either elect to allow the reboot to proceed, or elect to exit to the operating system. If a restore was completed using a recovery tool bootable floppy diskette, the recovery tool of the present embodiment reboots the system automatically without providing the user with the option to exit to the operating system. When the computer is restarted, operation proceeds with the recovery tool as described in reference to the flowcharts of FIGS. 2 and 2A, with the point of entry corresponding to the action taken in the ADVANCED MENU 350.

Another option provided in the ADVANCED MENU 350 is to check for file changes to all designated files monitored by the recovery tool, as represented in a decision block 450. This option is accessible to the user via a "Tools" pull down menu 354 (FIG. 13) within the ADVANCE MENU 350 in the present embodiment. The user activates this operation by selecting the "Check for missing and changed files" in the Tools pull-down menu 354. If the user selects this option, the recovery tool makes a comparison of the status of all files which have been selected for monitoring with a stored set of the status of corresponding files. The recovery tool displays a list of all changed files, as represented in an action block 455.

In the present embodiment, this check includes a check of the designated application files (including a check for files missing). As explained above, the status of the applications files monitored (files matching the file extension patterns stored in a recovery tool initialization file) are stored in a reference file used by the recovery tool to indicate which application files it monitors. As a default, in addition to the configuration files, the recovery tool monitors all files with the following file extensions for changes if the "Check for mission and changed files" option is selected:

| *.INI | *.CFG | *.GRP | *.EXE | *.COM |        |
|-------|-------|-------|-------|-------|--------|
| *.BAT | *.OVL | *.OV1 | *.OV2 | *.OV3 |        |
| *.OV4 | *.DLL | *.DRV | *.SYS | *.HLP |        |
| *.386 | *.INF | *.2GR | *.3GR | *.CPL | *.VBX  |

However, the user can modify this list by changing the extensions listed in the applications initialization file storing this information. The recovery tool of the present embodiment does not maintain complete back-up copies of these application files. The recovery tool maintains the status of all files matching the designated file extension patterns. When the recovery tool detects changes to the application files, the recovery tool indicates which files have changed (or are missing) to the user. The user may then elect to reinstall or otherwise repair files that have changed erroneously or are missing.

The ADVANCED MENU 350 further provides an option to restore all or selected files from an entire set of configuration files maintained by the recovery tool. This option is activated through the Tools pull-down menu 354 (FIG. 13), and is represented in a decision block 456 of the flowchart of FIG. 4A. If the user selects this option, the recovery tool provides a list of the entire set of files for which back-up copies are maintained by the recovery tool, without reference to changes to these files, as represented in an action block 457. The user then selects which files should be restored. The recovery tool then stores a copy of the existing files which are to be replaced in art UNDO file, and replaces the existing files with the selected back-up copies, as represented in the action block 410. This is the same operation as represented in action block 410.

Still a further option provided in the ADVANCED MENU 350 is to save the current system configuration, as represented in a decision block 460 (FIG. 4A). This option is accessible from a "Save" pull-down menu 356 (FIG. 14) within the ADVANCED MENU 350. If the user selects this option, the recovery tool saves the current AUTOEXEC.BAT, CONFIG.SYS, SYSTEM.INI files, and all other files with .INI, CFG, and .GRP file extensions, and also stores the status of these files. The recovery tool also stores the status (i.e., the name, size modification date (and time), and attributes) of the application files selected (by default or by the user) for monitoring. This operation is represented in an action block 465. The recovery tool also stores the contents of the CMOS non-volatile memory 111 in a back-up file. Another option available in the ADVANCED MENU 350 is to check for viruses. This option is represented in a decision block 470 (FIG. 4B, via continuation point E) and is accessible to the user via the Tools pull-down menu 354 (FIG. 13) within the ADVANCED MENU 350. Unfortunately, viruses, although rare, can destroy data on computer data storage devices. Therefore, virus detection and removal is a continuous endeavor. The recovery tool of the present invention assists in an indirect manner to detect viruses by monitoring changes to certain files. Changes to files can sometimes indicate the presence of a virus. The recovery tool also provides the option to make a direct virus scan using virus detection and removal software. The virus scan option in the present embodiment initiates a virus scan using the virus scanner provided with DOS version 6.0, as represented in an action block 475. In an alternative embodiment, the user selects the virus scanner program to utilize. To select the virus scan software of the user's choice, the user changes an indicator in the initialization file utilized by the recovery tool. The indicator is the name (and possibly path) of the virus scanner desired by the user.

An additional option provided by the recovery tool and accessible to the user through the ADVANCED MENU 350 is to make a bootable recovery tool diskette, as represented in a decision block 480 of FIG. 4B. This operation is activated by the user by selecting the "Make Recovery Diskette From Last Save" option in the Save pull-down menu 356 (FIG. 14) within the ADVANCED MENU 350. This option directs the user through steps which automatically create a bootable diskette which contains the current system configuration files and the recovery tool files. This is particularly advantageous in the event of configuration problems which cause the computer system to boot improperly from the hard disk or fail to boot at all.

In the present embodiment, when the recovery tool files are saved to the bootable diskette, a main reference or backup file storing the contents of the monitored configuration files is compressed using a compression utility to allow larger configurations to be saved to diskette. Another reference file which stores the status of the monitored files is not compressed in the current embodiment in order to enhance recovery tool performance in checking for changes (i.e., quickly scan the files and obtain a selection of files that have changed, or quickly obtain a listing of files that are missing without the need for decompression). When a configuration is restored from the bootable floppy diskette, the main reference file is decompressed to a temporary file on the system hard disk 118 or other disk used for the restore operation. This temporary file is deleted after the restore operation.

The present embodiment does not permit the use of multiple floppy diskettes to form the bootable diskette. With compression, only very large hard disk subsystems with thousands of configuration files would overflow the single floppy diskette. However, in an alternative embodiment, the recovery tool provides for handling more than one diskette for the bootable recovery diskette.

If the user elects to make a bootable back-up diskette, the recovery tool prompts the user to place a diskette in a disk drive. The recovery tool formats the disk, and copies the recovery tool files (e.g., recovery tool routines) and the configuration files (in the reference files discussed above) to the diskette, as represented in an action block 485.

Figure 13:
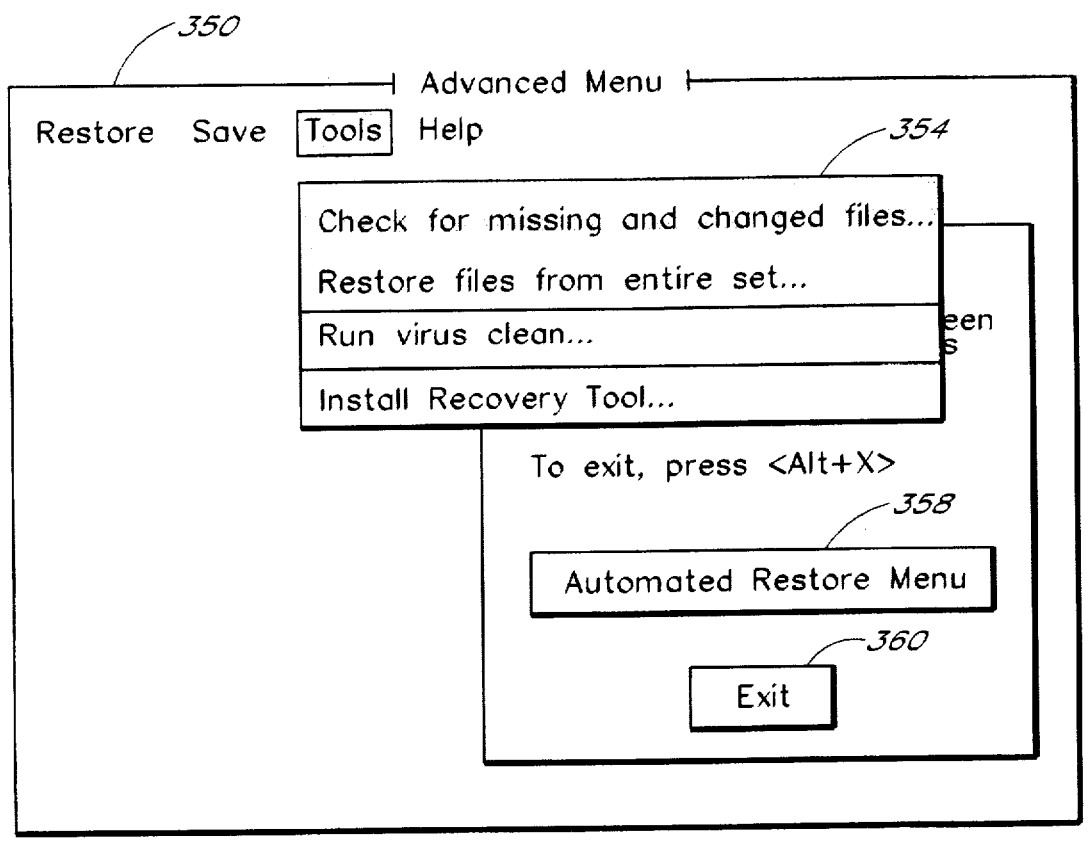
Figure 14:
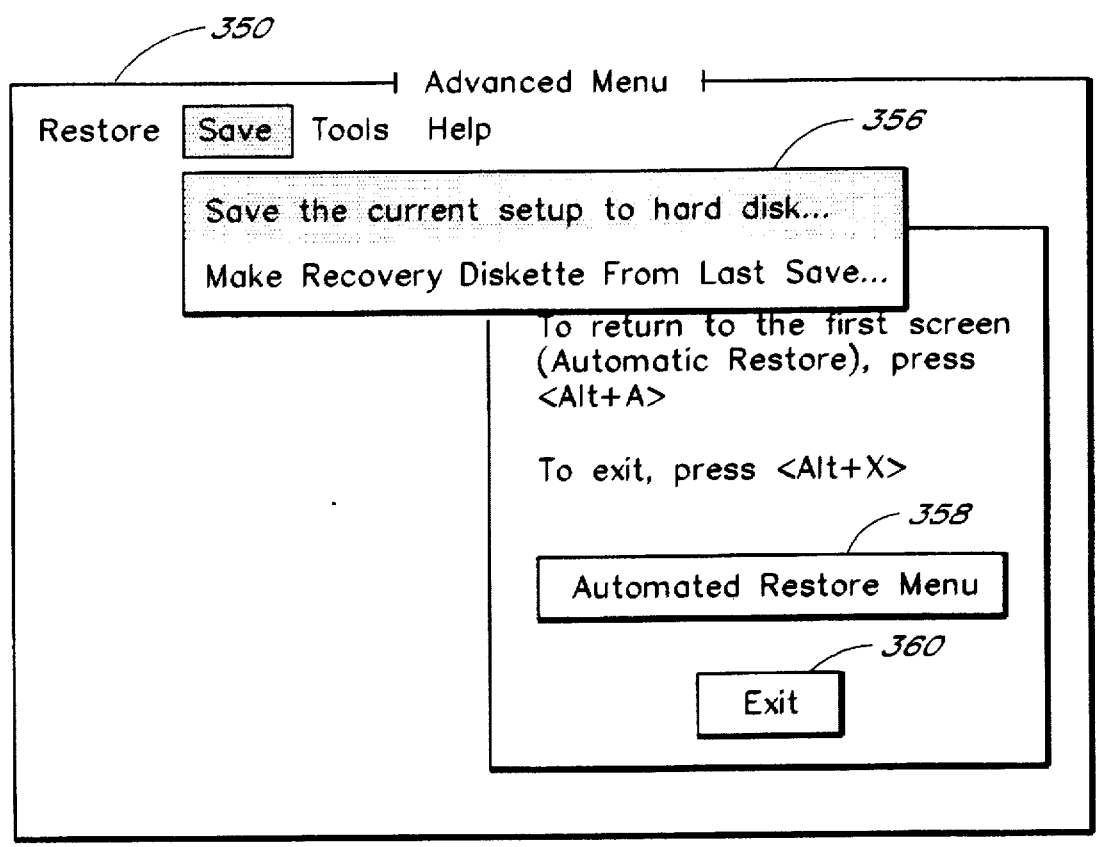

The ADVANCED MENU 350 also provides the option to install the recovery tool. This option is presented to the user via the Tools pull-down menu 354 (FIG. 13). This function represented in the decision block 486 and the action block 487 of the flowchart of FIG. 4B. This function provides an automatic install of the recovery tool onto the computer hard disk 118. In addition to copying the recovery tool operational files to the hard disk 118, the installation process places the necessary command line to initiate the check routine in the AUTOEXEC.BAT file. After the install, the first time the user starts the computer system, the user is notified that the recovery tool was installed, and the user is allowed to make a first backup.

The ADVANCED MENU 350 also provides the option of returning to the AUTOMATED RESTORE MENU 321 (FIG. 10), as represented in a decision block 490. The user activates this option by selecting the "AUTOMATED RESTORE MENU" text box 358 (FIG. 11) in the ADVANCED MENU 350. If the user selects this option, control returns to the AUTOMATED RESTORE MENU 321 of the recovery tool, as represented in an action block 495.

The user can also elect to exit the recovery tool from the ADVANCED MENU 350 directly, as represented in a decision block 500. The user activates this option by selecting the "Exit" text box 360 in the ADVANCED MENU 350. If the user elects to exit directly, before the user exits in the situation where any restore or undo operation has been performed, the recovery tool prompts the user with a suggestion to reboot the computer system, and provides a reboot option for the user, as represented in the action block 505. Alternatively, the user can exit to the operating system without a reboot of the computer. Also, as explained above for action block 330 of FIG. 3, if the recovery tool is running under Windows® in a DOS box, the recovery tool notifies the user that the restore will be effective upon reboot.

Figure 15:
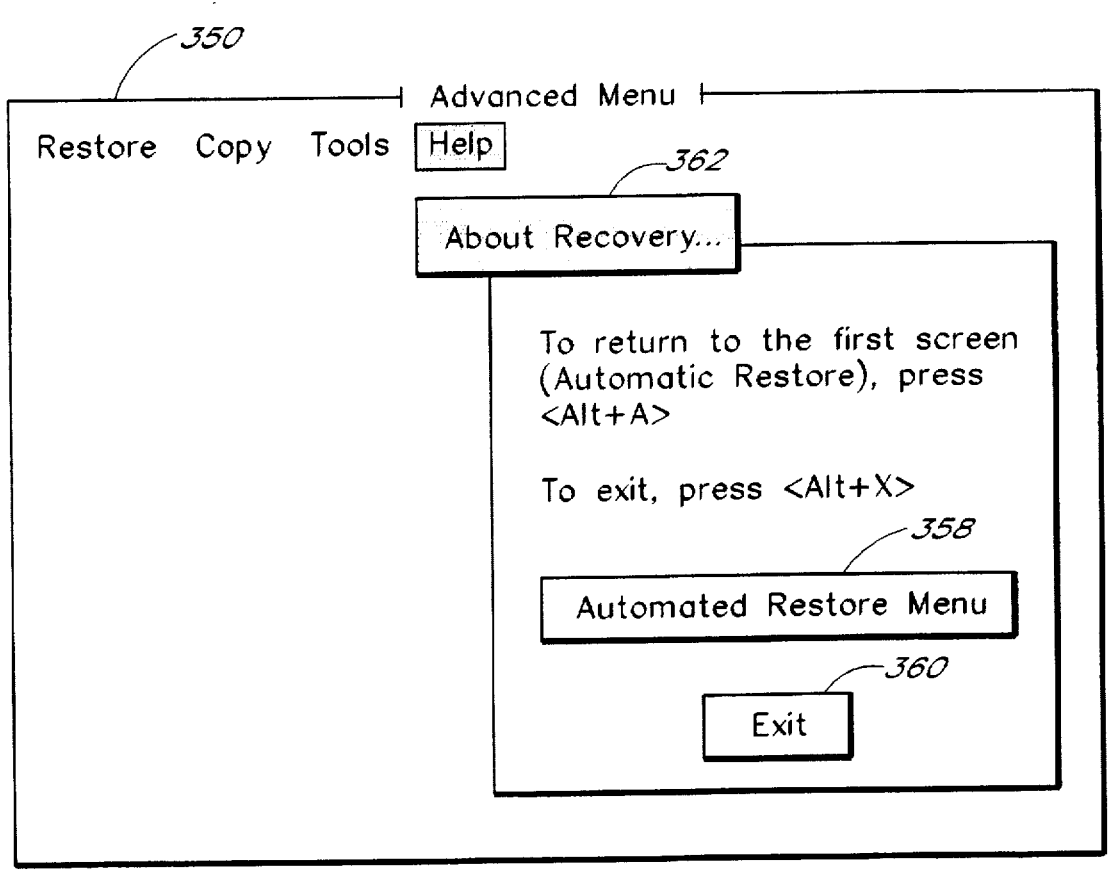

Finally, the user can also access help about the recovery tool with a "Help" pull down menu 362 (FIG. 15) within the ADVANCED MENU 350. Once help is activated, the recovery tool displays information about the recovery tool in a window on the computer display 114.

In summary, the present invention provides a computer configuration recovery tool with several options available to automatically restore a computer system's configuration. The recovery tool also provides additional control for restore operations through an ADVANCED MENU, as well as additional options such a checking for viruses. The recovery tool runs automatically from DOS at the initial start-up of the computer, or can be executed from the DOS command line. In addition, the recovery tool provides for the option of making a back-up floppy diskette which is bootable. Accordingly, the recovery tool of the present invention allows a user to recover from changes to the system configuration, including the user's Microsoft Windows® configuration, when those changes are minor or catastrophic. Even if the computer will not boot at all, the user can use the bootable floppy diskette to restore the prior configuration files. If the computer will boot, but the user is running Microsoft Windows® or the like and Windows® will not start, and if the reason is a change in the configuration files, the recovery tool will indicate changes in the configuration files, and will aid the user is restoring the Windows® configuration.

The present invention, therefore, is advantageous, in that after installation and initialization, the computer configuration can experience catastrophic configuration changes which can be restored by even the novice computer user.

Figure 16:
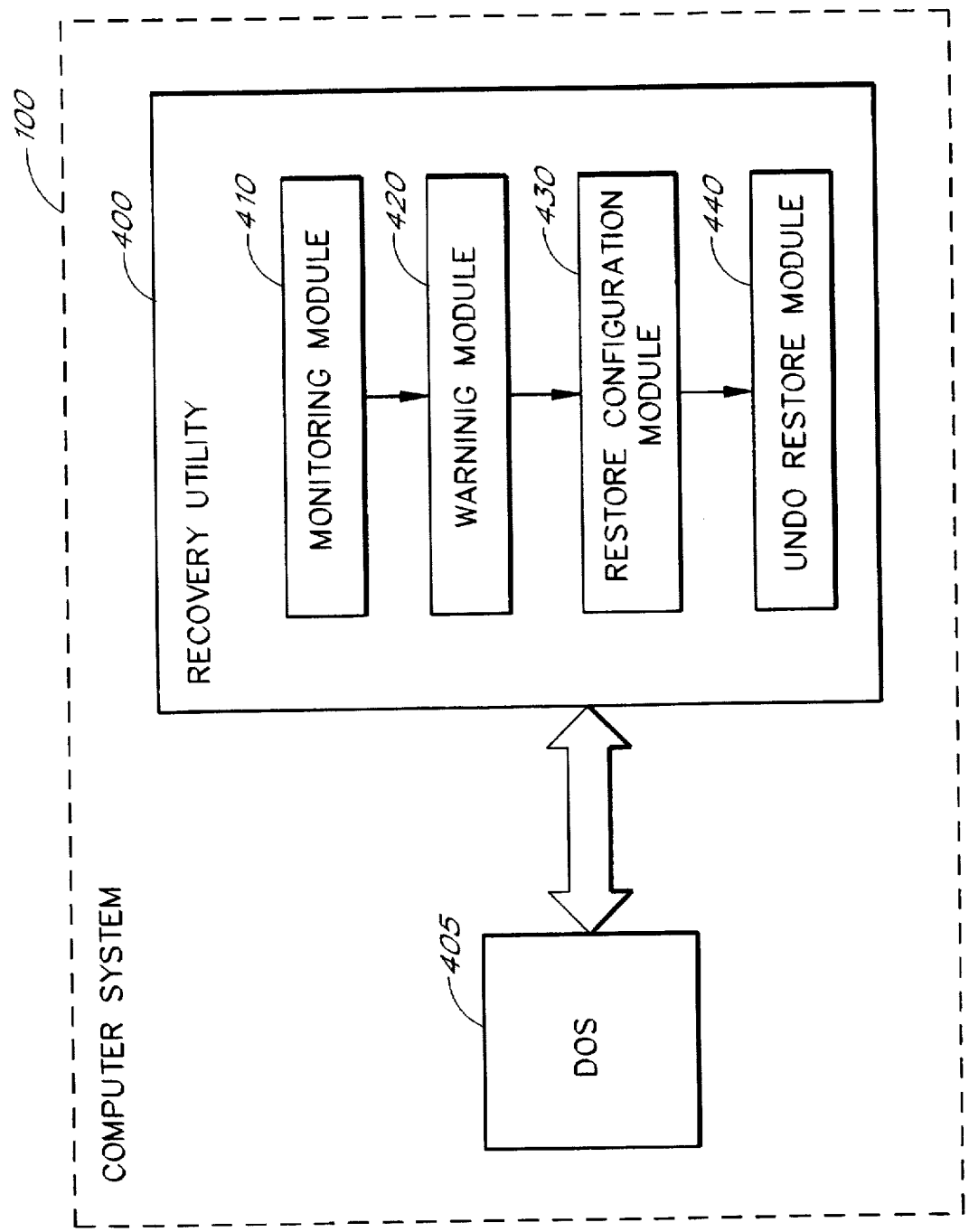

In addition, the recovery tool is advantageous in that it provides for the option of restoring the CMOS nonvolatile memory in case of the CMOS becoming corrupted. These and many other advantages will be appreciated by those skilled in the art. FIG. 16 schematically depicts the main functional elements of the recovery tool of the present invention implemented within the computer system 100. Specifically, the recovery tool comprises a recovery utility 400 which is in communication with a disk operating system (DOS) of the computer system 100. The recovery utility 400 includes modules 410–440 which correspond to the above described operations of the recovery utility 400. In particular, the monitoring module 410 performs the monitoring operation of the recovery tool, the warning module 420 performs the warning operation of the recovery tool, the restore configuration module 430 performs the restore configuration operations of the recovery tool and the undo restore module 440 performs the undo restore operation of the recovery tool.

Although the present embodiment has been described as for computers operating with DOS and computer operating with DOS plus MS-Windows®, the present invention can also be implemented with computers utilizing other operating systems that employ configuration or initialization files. The present invention can also be implemented with computer systems having other than Intel® 80×86 compatible processors. In addition, although the present invention was described as utilizing the status of the configuration files to determine whether changes to those files have been made, the entire file could be compared. Furthermore, if the user desires to ignore certain changes that occur frequently, the present invention can be implemented to allow the user to configure the recovery tool to ignore selected changes to the configuration files.

The recovery tool the present invention was described above as checking the CMOS non-volatile memory to determine if it is valid by checking for the definition of a hard disk drive. However, in an alternative embodiment, the recovery tool can be implemented to scan the CMOS memory for any changes. Many well known methods are known in the art, such as using a checksum, to determine if the contents of a memory have changed.

The invention described above may be embodied in many specific forms which do not depart from the essential spirit and scope of the invention. Therefore, the above description should be understood as simply illustrative and not restrictive. Accordingly, the extent and essence of the present invention is defined by the following claims.

What is claimed is:

1. A method of monitoring and restoring a software configuration within a computer system having a computer, wherein said software configuration comprises an arrangement of code, data and parameters stored in memory which defines the operation of the computer system, said method comprising the steps of:

storing with the computer system a functional back-up copy of the software configuration on computer data storage media to form a first back-up copy of the software configuration;

comparing with the computer system the first back-up copy of the to software configuration with a current software configuration each time the computer is started, wherein the step of comparing provides an indication of any changes to the current software configuration since the back-up a copy was stored;

permitting the user to verify proper computer system operation of application software installed on the computer system, and querying the user with a screen display to indicate if computer system operation is proper;

if the computer system operation is proper with a changed software configuration, prompting the user with a first screen display to back up with the computer the software configuration to create a second back-up software configuration replacing said first back-up software configuration; and if the computer system operation is not proper, saving with the computer the current software configuration in an undo set on the computer data storage media and restoring with the computer the software configuration to the first back-up software configuration.

2. The method of claim 1, wherein restoring the software configuration to the first back-up software configuration comprises the steps of:

indicating with a second screen display which of a plurality of present configuration files for the computer system have been changed in comparison to the first back-up software configuration to define a set of changed configuration files;

querying a user to select which of the changed configuration files should be restored to produce a set of selected files; and saving the set of selected files selected by the user in an undo set on the computer data storage media and replacing the present configuration files for the computer system with files having a corresponding function from the first back-up copy of the software configuration.

3. The method of claim 1, wherein the step of restoring comprises the steps of:

indicating with a screen display which of a plurality of present configuration files for the computer system have been changed in comparison to the first back-up software configuration to define a set of changed configuration files;

querying a user whether to restore the set of changed configuration files; and saving the set of changed configuration files in an undo set on the computer data storage media and replacing the changed configuration files for the computer system with files having a corresponding function from the first back-up copy of the software configuration.

4. The method of claim 1, further comprising the steps of:
   prompting a user with a screen display to verify proper computer system operation if the software configuration is restored to the first back-up software configuration;
   querying the user with a screen display to indicate whether the computer system operation using the first back-up software configuration is proper; and
   if the user indicates that computer system operation is not proper, replacing the first back-up software configuration with the second back-up software configuration.

5. The method of claim 1, further comprising the steps of:
   storing with the computer on computer data storage media a functional first back-up copy of contents of a computer system CMOS nonvolatile memory, said computer system CMOS nonvolatile memory storing computer system operation parameters and functions;
   analyzing the computer system CMOS nonvolatile memory to determine whether the computer system CMOS nonvolatile memory has become corrupted;
   querying a user whether to restore the computer system CMOS nonvolatile memory; and
   restoring with the computer the computer system CMOS nonvolatile memory with a back-up copy of the contents of the computer system CMOS nonvolatile memory if the computer system CMOS nonvolatile memory is determined to be corrupted.

6. The method of claim 5, wherein said step of analyzing the computer system CMOS nonvolatile memory to determine whether the computer system CMOS nonvolatile memory is corrupted comprises determining if a first hard disk storage device is defined in said computer system CMOS nonvolatile memory.

7. A computer system configuration recovery utility for use in monitoring a computer system configuration and indicating to a user when changes to the computer system configuration are detected after the recovery utility is initialized by backing up the computer system configuration to generate a backed-up configuration, the recovery utility further directing the user through menus to allow the user to restore the computer system configuration if desired, the recovery utility comprising:
   a computer system;
   a monitoring module having a format which the computer system executes from a Disk Operating System (DOS) and wherein said monitoring module automatically detects changes that have been made to selected configuration files since a the selected configuration files were last backed up by the recovery utility;
   a warning module having a format which the computer system executes, and wherein said warning module prompts the user on a computer display when said changes are detected by said monitoring module; and
   a restore configuration module having a format which the computer system executes, and wherein the restore configuration module queries the user via prompts on the computer display screen whether the user desires to restore the computer system configuration to the backed-up configuration when changes have been detected, and which responds to selections by the user in response to the queries to restore the computer system configuration by replacing an existing computer system configuration with the backed-up configuration.

8. The computer system configuration recovery utility of claim 7, wherein said restore configuration module further creates an undo set copy of the existing computer system configuration before replacing the existing computer system configuration with the backed-up configuration.

9. The computer system configuration recovery utility of claim 8, further comprising an undo module which queries the user after the computer system configuration has been restored to the backed-up configuration whether the user desires to undo the restore, and which in response, replaces said backed-up configuration with said existing computer system configuration.

10. A method of monitoring and restoring a computer system configuration within a computer system having a computer with a disk operating system, said method comprising the steps of:
   storing a back-up copy of a functional computer system configuration on computer data storage media in at least one file to form a first back-up system configuration;
   from the Disk Operating System, comparing an existing computer system configuration with said first back-up system configuration;
   prompting a user via a computer display to verify proper computer system operation with said existing computer system configuration if changes are detected between said first back-up system configuration and said existing computer system configuration;
   prompting the user via the computer display to indicate whether the computer system operated properly with said existing computer system configuration;
   if the user responds by indicating that system operation is proper, storing a backup copy of the existing computer system configuration to create a second back-up copy of the computer system configuration;
   if the user responds that computer system operation is not proper, querying the user if the user desires to restore the computer system configuration to the first back-up system configuration; and
   if the user responds to restore the computer system configuration, replacing the existing computer system configuration with the first back-up system configuration.

11. The method of claim 10, wherein said step of storing a back-up copy comprises storing a status of files representing the computer system configuration in a first reference file and storing contents of said files representing the computer system configuration in a second reference file.

12. The method of claim 10, further comprising the steps of:
   storing selected information coresponding to a first set of selected computer application files when said first set selected computer application files is known to operate properly; and
   comparing the stored selected information with selected information from existing application files corresponding by name with said first set of selected computer application files, said step of comparing further comprising prompting the user with an indication of any of said selected computer application files which have changed since said first set of selected computer application files were stored.

13. The method of claim 10, further comprising the steps of:
   querying a user whether to create a bootable diskette with the functional computer system configuration stored thereon; and creating the bootable diskette with the functional computer system configuration stored thereon.

14. The method of claim 13, further comprising the step of storing on said bootable diskette tools to restore the computer system configuration.

15. A method of monitoring and restoring a computer system configuration within a computer system having a computer, said computer system configuration comprising a plurality of data, said method comprising the steps of:

storing with the computer a first back-up of the computer system configuration to form a first back-up computer system configuration;

automatically comparing with the computer the first back-up computer system configuration with a current computer system configuration to detect whether the current computer system configuration differs from the first back-up computer system configuration; and if differences between the first back-up computer system configuration and the current computer system configuration are detected, indicating that the current computer system configuration differs from the first back-up computer system configuration and querying a user with a first screen display whether to restore the computer system configuration to the first back-up computer system configuration.

16. The method of claim 15, further comprising the steps of:

monitoring user input entered in response to said query; and restoring with said computer, in response to said user input, the computer system configuration to the first back-up computer system configuration.

17. A method of monitoring and restoring a computer system configuration within a computer system having a computer, said computer system configuration comprising a plurality of data, said method comprising the steps of:

storing with the computer a first back-up of the computer system configuration to form a first back-up computer system configuration, said first back-up computer system configuration defined by at least one backup configuration file for the computer system;

automatically comparing with the computer the first back-up computer system configuration with a current computer system configuration to detect whether the current computer system configuration differs from the first back-up computer system configuration, said current computer system configuration defined by a plurality of current configuration files for the computer system;

if differences between the first back-up computer system configuration and the current computer system configuration are detected, indicating that the current computer system configuration differs from the first back-up computer system configuration and querying a user with a first screen display whether to restore the computer system configuration to the first back-up computer system configuration;

displaying which of the plurality of current configuration files have been changed with respect to the first back-up computer system configuration;

automatically selecting all current configuration files which have been changed for restoration; and replacing with the computer all current configuration files which have been selected for restoration.

18. A method of monitoring and restoring a computer system configuration within a computer system having a computer, said computer system configuration comprising a plurality of data, said method comprising the steps of:

storing with the computer a first back-up of the computer system configuration to form a first back-up computer system configuration, said first back-up computer system configuration defined by at least one backup configuration file for the computer system;

automatically comparing with the computer the first back-up computer system configuration with a current computer system configuration to detect whether the current computer system configuration differs from the first back-up computer system configuration, said current computer system configuration defined by a plurality of current configuration files for the computer system;

if differences between the first back-up computer system configuration and the current computer system configuration are detected, indicating that the current computer system configuration differs from the first back-up computer system configuration and querying a user with a first screen display whether to restore the computer system configuration to the first back-up computer system configuration;

displaying which of the plurality of current configuration files have been changed with respect to the first back-up computer system configuration to define a set of changed configuration files, said set having at least one file;

querying the user which file in the set of changed configuration files to restore; and replacing with the computer all current configuration files which have been selected for restoration with a corresponding file from the first back-up computer system configuration.

19. A method of monitoring and restoring a computer system configuration within a computer system having a computer, said computer system configuration comprising a plurality of data, said method comprising the steps of:

storing with the computer a first back-up of the computer system configuration to form a first back-up computer system configuration;

automatically comparing with the computer the first back-up computer system configuration with a current computer system configuration to detect whether the current computer system configuration differs from the first back-up computer system configuration;

if differences between the first back-up computer system configuration and the current computer system configuration are detected, indicating that the current computer system configuration differs from the first back-up computer system configuration and querying a user with a first screen display whether to restore the computer system configuration to the first back-up computer system configuration;

displaying which of the plurality of data have been changed with respect to the first back-up computer system configuration to define a set of changed configuration data;

querying the user which of data from the set of changed configuration data are to be restored; and replacing with the computer all current configuration data which have been selected for restoration with corresponding data form the first back-up computer system configuration.

* * * * *

UNITED STATES PATENT AND TRADEMARK OFFICE
CERTIFICATE OF CORRECTION

PATENT NO. : 5,745,669
DATED : April 28, 1998
INVENTOR(S) : James M. Hugard, et. al.

It is certified that error appears in the above-identified patent and that said Letters Patent is hereby corrected as shown below:

In Column 16, at line 18, change "of the to software" to --of the software--

In Column 16, at line 21, change "a copy was" to --copy was--

In Column 17, at line 52, change "since a the" to --since the--

In Column 18, at line 32, change "backup copy" to --back-up copy--

In Column 18, at line 53, change "set selected" to --set of selected--

In Column 19, at line 41, change "backup" to --back-up--

In Column 20, at line 6, change "backup" to --back-up--

Signed and Sealed this

Sixth Day of April, 1999

Attest:

Attesting Officer

Q. TODD DICKINSON

Acting Commissioner of Patents and Trademarks